United States Patent [19]

Stewart

[11] E Patent Number: Re. 33,438

[45] Reissued Date of Patent: Nov. 13, 1990

[54] COUPLING MECHANISM

[75] Inventor: James P. Stewart, Cupertino, Calif.

[73] Assignee: Lockheed Missiles & Space Company, Inc., Sunnyvale, Calif.

[21] Appl. No.: 293,355

[22] Filed: Jan. 4, 1989

Related U.S. Patent Documents

Reissue of:

[64] Patent No.: 4,679,961
Issued: Jul. 14, 1987
Appl. No.: 874,980
Filed: Jun. 16, 1986

[51] Int. Cl.[5] ..... F16B 1/00

[52] U.S. Cl. ..... 403/341; 403/176; 52/646; 24/653; 24/654

[58] Field of Search ..... 403/341, 171, 172, 176, 403/316, 328, 327, 170, 164, 165; 52/695, 646, 648, 81; 24/653, 654, 702

[56] References Cited

U.S. PATENT DOCUMENTS

| | | | |
|---|---|---|---|
| 1,851,843 | 3/1932 | Unman | 403/327 |
| 2,448,817 | 9/1948 | McArthur | 403/341 X |
| 3,276,799 | 10/1966 | Moore et al. | 403/316 |
| 3,632,147 | 1/1972 | Finger | 403/176 X |
| 4,637,193 | 1/1987 | Lange | 403/176 X |
| 4,645,373 | 2/1987 | Purdy | 403/341 |

FOREIGN PATENT DOCUMENTS

| | | | |
|---|---|---|---|
| 1294500 | 4/1962 | France | 403/171 |
| 378210 | 1/1940 | Italy | 403/341 |
| 10330 | of 1914 | United Kingdom | 403/341 |

OTHER PUBLICATIONS

MIT, "MIT Connector Design", Technical Document, 10/1985.

NASA, "Ease/Access: Framework for the Future" 10/1985, pp. 8, 11 and 13.

Lockheed Horizons; Pelka, "Space Station Assembly: Techniques and Structures", pp. 40 and 43, Issue 25, 12/1987.

*Primary Examiner*—Peter M. Cuomo
*Attorney, Agent, or Firm*—John J. Morrissey

[57] ABSTRACT

A mechanism for coupling a strut (30) to a nodal element (32) comprises a female coupling fixture (31) and a male coupling fixture (33). The female coupling fixture (31) includes an elongate cylindrical member (35), a distal end of which is hemicylindrically configured with an inner surface that is contoured to receive a conjugately contoured knob on a distal end of the male coupling fixture (33) in mating engagement. The female coupling fixture (31) also includes a sleeve (36), which is slidable coaxially from an OPEN position around an intermediate portion of the cylindrical member (35) to a LOCKED position around the matingly engaged distal ends of the cylindrical member (35) and the male coupling fixture (33). Spring-biases locking bars (50) and (51) maintain the sleeve (36) in the LOCKED position.

8 Claims, 15 Drawing Sheets

COUPLING MECHANISM

Matter enclosed in heavy brackets [ ] appears in the original patent but forms no part of this reissue specification; matter printed in italics indicates the additions made by reissue.

TECHNICAL FIELD

This invention relates generally to coupling mechanisms, and more particularly to a quick-connect coupling mechanism for securing a strut to a nodal element in the construction of a truss structure.

BACKGROUND OF THE INVENTION

Truss structures have been constructed from kits comprising struts and nodal elements, which fit together so that one end of each of several different struts can be secured to one nodal element, and so that the other ends of the different struts can be secured to corresponding other nodal elements. The construction of model truss structures from TINKERTOY kits provides a familiar example of this construction technique. (TINKERTOY is a registered trademark of Questor Corporation, Toledo, Ohio).

SUMMARY OF THE INVENTION

The present invention provides a coupling mechanism, which facilitates the erection of truss structures from kits comprising struts and nodal elements. Kits whose struts and nodal elements can be joined using the coupling mechanism of the present invention are designed for erecting large-scale truss structures under adverse working conditions (e.g., aircraft hangers and other types of shelters in arctic environments, underwater and bridge structures in combat situations, and habitable structures in extraterrestrial space).

In using a kit of the present invention, a construction worker secures a strut of a nodal element by means of the novel coupling mechanism described hereinafter as a step in erecting a particular type of truss structure according to a predetermined design. Ordinarily, the struts of the kit must be connectable quickly and securely to the nodal elements of the kit with a minimum of physical exertion being required of the worker performing the construction. It is therefore an object of the present invention to provide a quick-connect coupling mechanism by which a strut can be secured to a nodal element in erecting a truss structure, particularly a large-scale truss structure whose struts are likely to be unwieldy (in terms of length and/or weight) for a construction worker to handle.

The coupling mechanism of the present invention comprises a female coupling fixture and a male coupling fixture, which a construction worker can connect together quickly and with a minimum of physical exertion. In the preferred embodiment of the invention, the female coupling fixture is secured to an end of a strut, and the male coupling fixture is secured to a nodal element. In principle, however, operation of the coupling mechanism does not depend upon whether the female coupling fixture is secured to the strut and the male coupling fixture is secured to the nodal element, or vice versa. Thus, in a particular application it might be appropriate for the female coupling fixture to be secured to the nodal element and for the male coupling fixture to secured to the strut.

The female coupling fixture according to the present invention comprises a solid circularly cylindrical member, which has a proximal end that is secured coaxially to an end of the strut, and a distal end that engages the male coupling fixture. The male coupling fixture is a lug, which is secured to and projects from the nodal element. The distal end of the cylindrical member of the female coupling fixture is of partially cylindrical configuration (e.g., hemicylindrical configuration), and has an inner surface that is contoured to receive a conjugately contoured knob-like extremity on the distal end of the lug.

The female coupling fixture further comprises a locking sleeve, which is configured as a hollow cylinder that is slidable coaxially over the solid cylindrical member from an OPEN position to a LOCKED position. When the locking sleeve is at the OPEN position, the inner surface of the hemicylindrical distal end of the cylindrical member is exposed to receive the knob-like extremity on the distal end of the lug. When the locking sleeve is slid to the LOCKED position after the hemicylindrical distal end of the cylindrical member has received the knob-like extremity on the distal end of the lug, the sleeve locks the male and female coupling fixtures together in mating engagement and thereby secures the strut to the nodal element.

It is a feature of a coupling mechanism comprising male and female coupling fixtures according to the present invention that a strut with the female coupling fixture secured thereto can be connected to a nodal element having the male coupling fixture secured thereto, or vice versa, by merely bringing the inner surface of the hemicylindrical distal end of the cylindrical member of the female coupling fixture into overlapping side contact with the knob-like extremity on the distal end of the male coupling fixture (i.e., the lug projecting from the nodal element). The present invention does not require that the female coupling fixture approach the male coupling fixture (or vice versa) from any unique angle (e.g., end-to-end) in order to achieve mating engagement. This feature wherein engagement of the male and female coupling fixtures can be achieved by overlapping side contact with each other considerably minimizes the time required to connect the strut to the nodal element.

It is another feature of the coupling mechanism of the present invention that the male and female coupling fixtures can be securely locked in mating engagement with each other by a simple sliding motion of the locking sleeve between two fixed positions (i.e., from the OPEN position to the LOCKED position). This feature wherein the male and female coupling fixtures can be locked together by simply sliding a cylinder from one position to another considerably minimizes the physical effort required of a construction worker to connect the strut to the nodal element.

BEST MODE OF CARRYING OUT THE INVENTION

Figure 1:
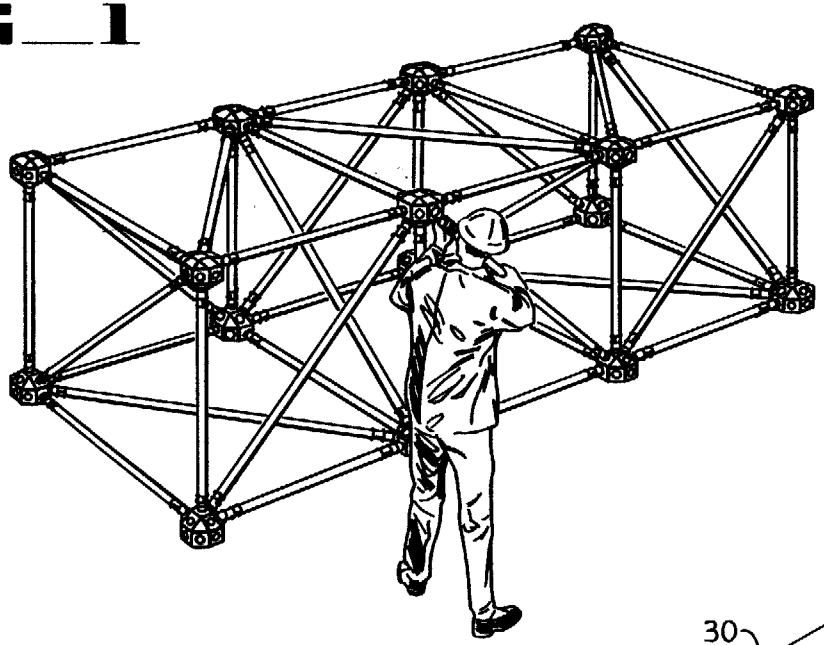
FIG. 1 is a perspective view of a truss structure (or portion of a truss structure) in the process of being erected from a kit comprising a set of struts and nodal elements, which are connected together by coupling mechanisms according to the present invention.

FIG. 1 shows a truss structure (or a portion of a truss structure of unspecified configuration), which is in the process of being erected from a set of strut assemblies and node assemblies in accordance with the present invention. In the preferred embodiment of the invention, the strut assemblies and node assemblies are components of a kit, and can be connected to each other in various ways according to predetermined designs to permit truss structures of a variety of different configurations to be constructed.

Figure 2:
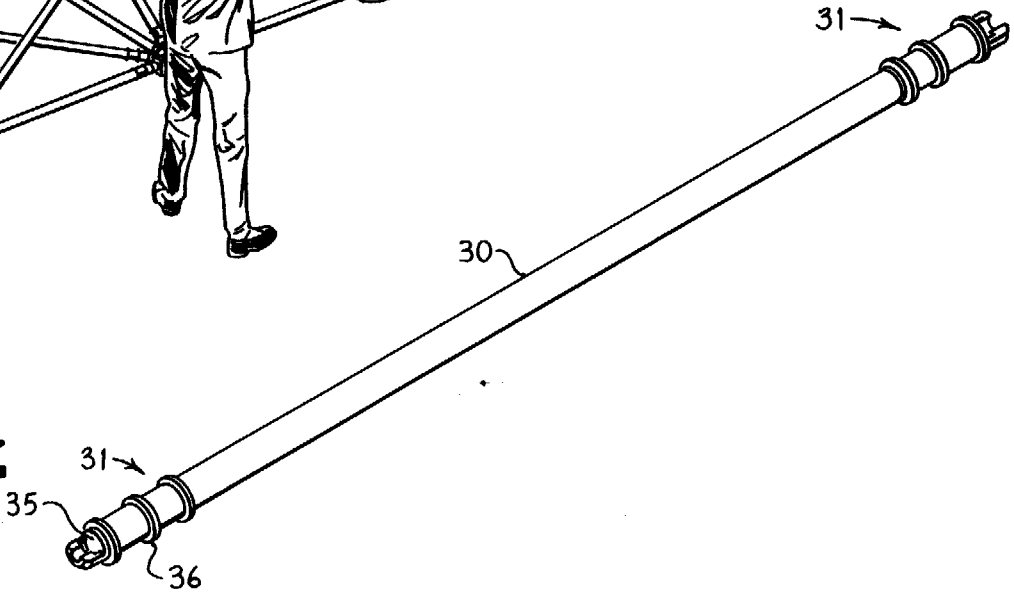
FIG. 2 is a perspective view of a strut assembly used in erecting the truss structure of FIG. 1, where the strut assembly comprises a strut with female coupling fixtures according to the present invention secured at corresponding ends thereof.

In FIG. 2, a strut assembly used in erecting the truss structure of FIG. 1 is illustrated in perspective view. The strut assembly of FIG. 2 comprises an elongate strut 30 of generally cylindrical configuration to which a pair of female coupling fixtures 31 are affixed, one at each end. Depending upon the particular application, the strut 30 could be hollow or solid. The strut 30 could be made of a metal such as steel or an aluminum alloy, or a non-metal such as a graphite-epoxy composite material.

Figure 3:
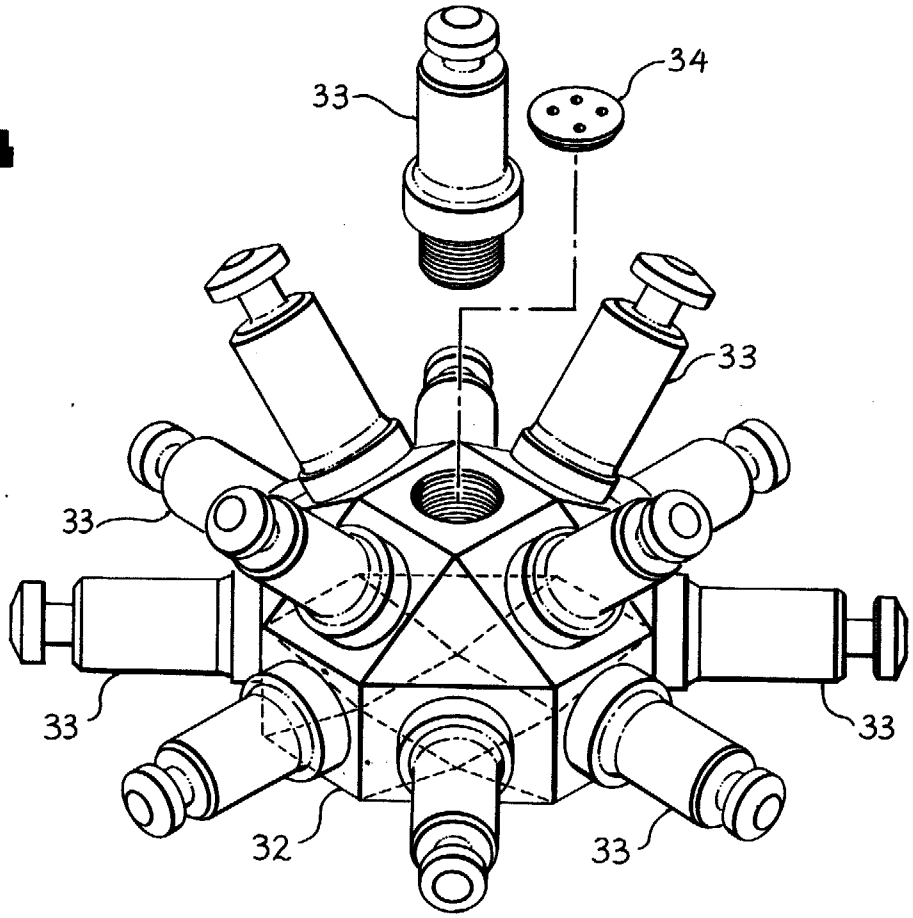
FIG. 3 is a perspective view of a node assembly used in erecting the truss structure of FIG. 1, where the node assembly comprises a multifaceted nodal element with male coupling fixtures according to the present invention projecting from corresponding facets thereof.

In FIG. 3, a node assembly used in erecting the truss structure of FIG. 1 is illustrated in perspective view. The node assembly of FIG. 3 comprises a multifaceted nodal element 32 to which one or more lugs 33 are affixed. Each lug 33 projects from a corresponding facet of the nodal element 32, and functions as a male coupling fixture. In the preferred embodiment, each lug 33 is secured to the nodal element 32 by inserting a screw-threaded proximal end of the lug 33 into a conjugately screw-threaded bore in the corresponding facet of the nodal element 32.

In an ordinary application, there would be no need for lugs 33 to project from all the facets of the nodal element 32. Thus, in the truss structure illustrated in FIG. 1, a node assembly at a corner of the truss structure needs only four or five lugs 33, and a node assembly positioned elsewhere in the truss structure needs only six or seven lugs 33, depending upon the actual location of the particular node assembly. Whether or not a lug 33 is to be inserted into the bore in a particular facet of the nodal element 32 depends upon the design of the truss structure that is to be erected. As shown in FIG. 3, a screw-threaded dust cover 34 could be inserted instead of a lug 33 into the bore of any particular facet of the nodal element 32 where a lug 33 is not needed. In an application in which a bore in a particular facet of the nodal element 32 could be left exposed without detrimental effect, there would be no need to insert a dust cover 34 into such a bore.

In a kit comprising strut assemblies and node assemblies according to the preferred embodiment of the present invention, the strut assemblies would differ in significant respects from each other (if at all) only in the lengths of the struts 30 of some of the strut assemblies. There would ordinarily be a plurality of strut assemblies in the kit for each of several different strut lengths, and all strut assemblies with struts 30 of the same length would be interchangeable with each other. Complete node assemblies could be pre-assembled for kits that are dedicated to particular applications. Alternatively, however, a plurality of nodal elements 32 and lugs 33 could be included as separate items in the kit. Ordinarily, all the nodal elements 32 would be fungible, and all the lugs 33 would likewise be fungible.

Each female coupling fixture 31 comprises a solid circularly cylindrical member 35 coaxially surrounded by a cylindrical sleeve 36. A proximal end of the cylindrical member 35 is secured to an end of the strut 30 in a conventional manner. A distal end of the cylindrical member 35 is hemicylindrically configured with an inner surface (as shown in FIG. 2), which is contoured to receive a conjugately contoured knob (as shown in FIG. 3) on the distal end of any one of the lugs 33 projecting from the nodal element 32.

Figure 4:
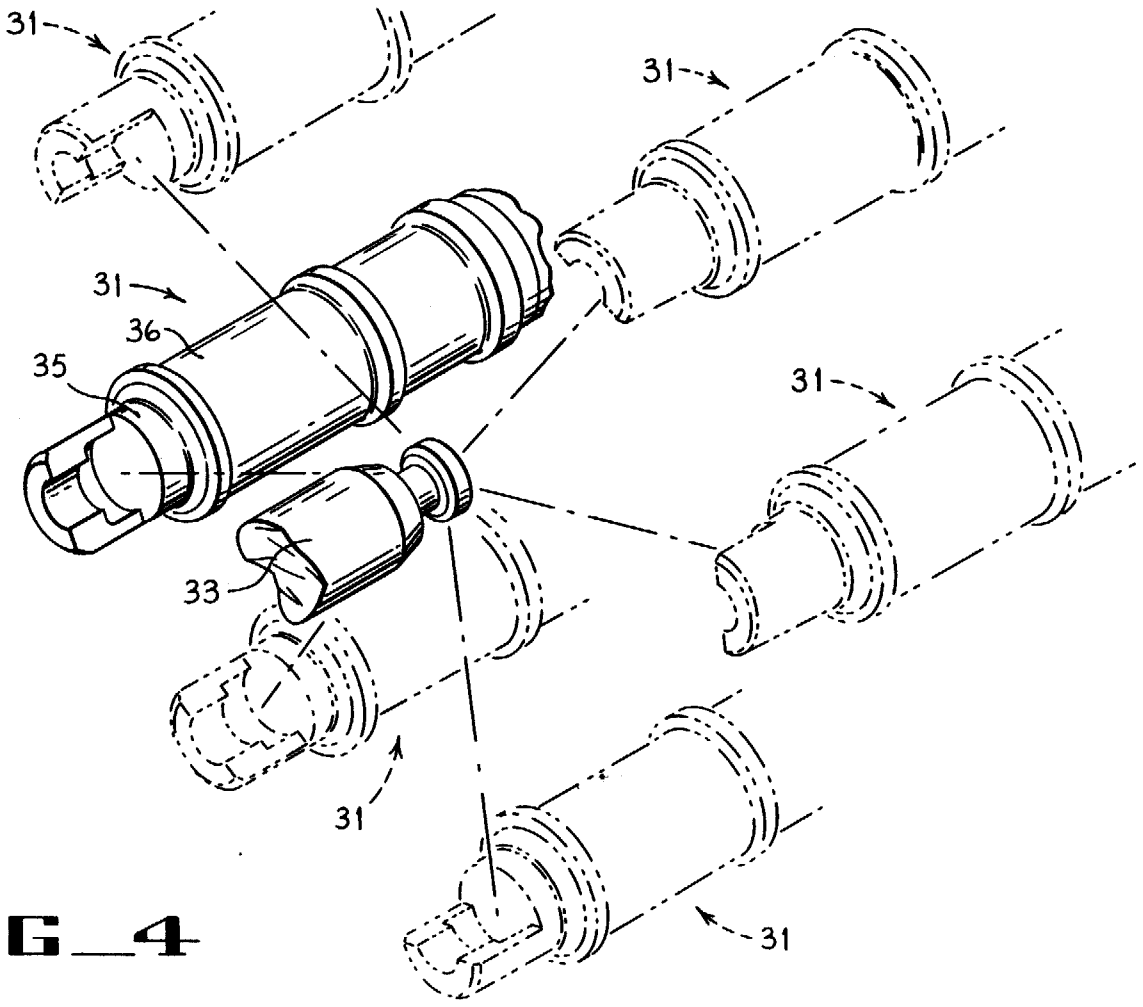
FIG. 4 is a perspective view showing the distal end of a female coupling fixture being brought into overlapping side contact with the distal end of a male coupling fixture when the strut assembly of FIG. 2 is being joined to the node assembly of FIG. 3, where phantom outlines showing the distal end of the female coupling fixture in various locations indicate alternative directions from which the female coupling fixture can approach the male coupling fixture.

In accordance with the present inventions, a construction worker connects a strut assembly to a node assembly by maneuvering the strut assembly so that the distal end of the cylindrical member 35 of the female coupling fixture 31 at one end of the strut assembly comes into overlapping side contact with the distal end of one of the lugs 33 on the nodal assembly. Side-contact of the distal end of the cylindrical member 35 with the distal end of the lug 33 can be made from any convenient direction of approach within a wide range of approach angles, as indicated in FIG. 4. Phantom outlines for the female coupling fixture 31 are shown in FIG. 4 to indicate various possible directions from which the distal end of the cylindrical member 35 of the female coupling fixture 31 can be brought into contact with the distal end of the lug 33. The knob on the distal end of the lug 33 is preferably of disc-like configuration, and the edges on the knob are appropriately chamfered to facilitate reception of the knob by the conjugately configured recessed portion of the inner surface of the distal end of the cylindrical member 35.

Figure 5:
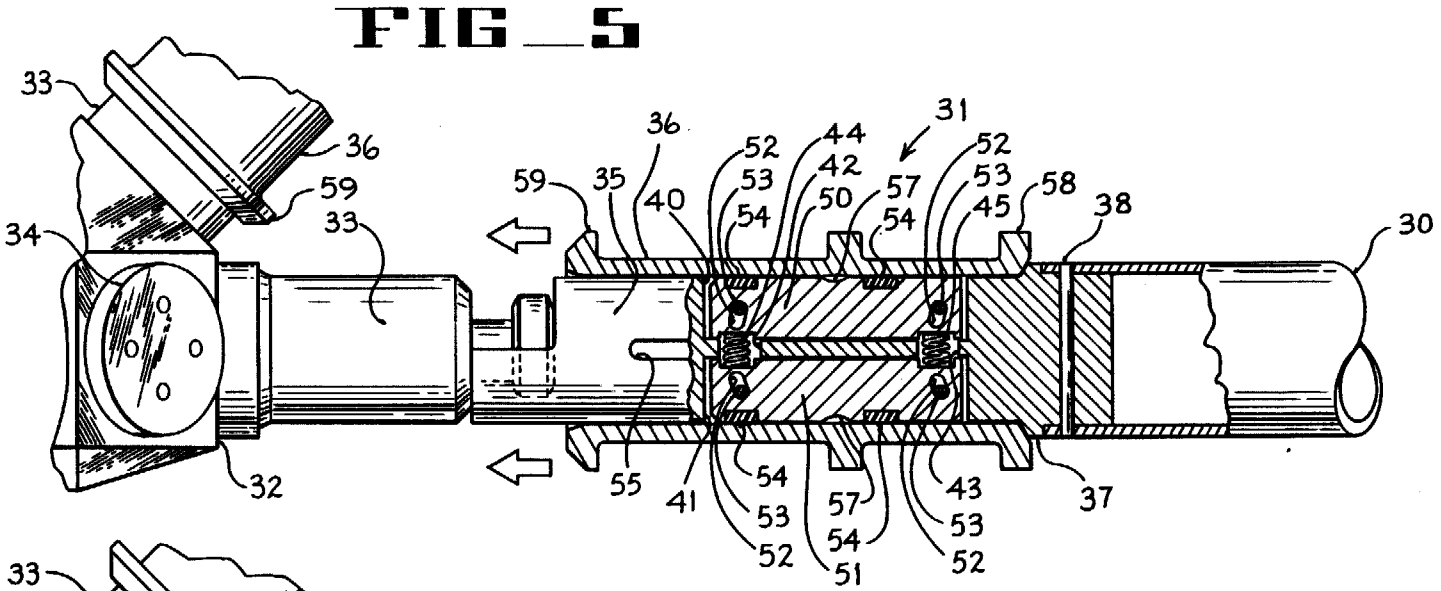
FIG. 5 is an elevation view partially in longitudinal cross section showing the distal end of a female coupling fixture on the strut assembly of FIG. 2 in mating engagement with the distal end of a male coupling fixture on the node assembly of FIG. 3, where a locking sleeve of the female coupling fixture is in OPEN position.

FIG. 5 shows the proximal end of the cylindrical member 35 of the female coupling fixture 31 secured to one end of the strut 30 to form the strut assembly illustrated in FIG. 2. In the embodiment illustrated in FIG. 5, the strut 30 is of tubular configuration, and the proximal end of the cylindrical member 35 has a diameter dimensioned to permit swage-fitting thereof into the end of the strut 30. A flanged hilt portion 37 of the cylindrical member 35 makes abutting contact with the tubular end of the strut 30, thereby limiting the extent to which the proximal end of the cylindrical member 35 penetrates into the strut 30. The proximal end of the cylindrical member 35 may be permanently secured to the strut 30 by a conventional technique, which is representationally indicated in FIG. 5 by a pin 38 extending transversely through the strut 30 and through the proximal end of the cylindrical member 35. In a particular application, the pin 38 could be replaced by, e.g., one or more machine screws, a riveted joint, a brazed or welded joint, a glued joint, or some other type of joint. Depending upon the type of material used to fabricate the strut 30, the cylindrical member 35 could be formed integrally as an end portion of the strut 30 in certain applications.

As seen in cross section in FIG. 5, two longitudinally extending slots 40 and 41 are formed on transversely opposite sides of the solid cylindrical member 35. The slots 40 and 41 communicate with each other through two transverse passageways 42 and 43, which are located adjacent opposite ends of the longitudinally extending slots 40 and 41. Springs 44 and 45 are positioned in the transverse passageways 42 and 43, respectively. An elongate bar 50 is positioned in the slot 40, and an elongate bar 51 is positioned in the slot 41. The bars 50 and 51, which are called locking bars, are substantially identical to each other. A surface of the bar 50 facing the innermost (i.e., bottom) surface of the slot 40 has two recesses, which are located so as to be aligned with the transverse passageways 42 and 43, respectively, when the bar 50 is positioned in the slot 40. One of the recesses on this innermost surface of the bar 50 receives a first end of the spring 44, and the other recess on the innermost surface of the bar 50 receives a first end of the outer spring 45. Similarly, a surface of the bar 51 facing the innermost (i.e., bottom) surface of the slot 41 has two recesses, which are located so as to be aligned with the transverse passageways 42 and 43, respectively, when the bar 51 is positioned in the slot 41. One of the recesses on this innermost surface of the bar receives a second end of the spring 44, and the other recess on the innermost surface of the bar 51 receives a second end of the other spring 45.

Apertures 52 extend transversely through the locking bars 50 and 51 adjacent opposite ends thereof. Each of the apertures 52 is elongate in a direction that slants slightly away from perpendicularity (e.g., by about 15°) with respect to the longitudinal axis of the cylindrical member 35. Pins 53 extend through appropriately positioned holes (not visible in the cross-sectional view of FIG. 5) in the cylindrical member 35, and through corresponding apertures 52 in the locking bars 50 and 51, to retain the locking bars 50 and 51 within the slots 40 and 41, respectively. The pins 53 are cylindrical, and have a diameter that provides a frictionally tight fit between the pins 53 and the inner surfaces of the holes in the cylindrical member 35 so that longitudinal motion of the locking bars 50 and 51 within the slots 40 and 41, respectively, is prevented. Where necessary in a particular application to prevent the pins 53 from working themselves free from the holes in the cylindrical member 35, the pins 53 can be permanently bonded to the inside surfaces of the holes by a conventional technique such as brazing, gluing, etc. The ends of the pins 53 do not extend beyond the outer surface of the cylindrical member 35, and therefore do not interfere with sliding motion of the sleeve 36 over the cylindrical member 35.

Since the apertures 52 are elongate in a direction that deviates only slightly from perpendicularity with respect to the longitudinal axis of the cylindrical member 35, the locking bars 50 and 51 are free to move inward and outward in a substantially radial manner with respect to the longitudinal axis of the cylindrical member 35. When the sleeve 36 is in the position as shown in FIG. 5, the locking bars 50 and 51 are pressed radially inward against the bars of the springs 44 and 45. When pressed inward, the locking bars 50 and 51 compress the springs 44 and 45, and the transversely outermost end of each one of the elongate apertures 52 makes contact with a corresponding one of the pins 53. The position of the sleeve 36 pressing the locking bars 50 and 51 inward as shown in FIG. 5 is called the OPEN position, because the hemicylindrical distal end of the cylindrical member 35 is thereby exposed (i.e., "open") to receive the distal end of any one of the lugs 33.

Figure 6:
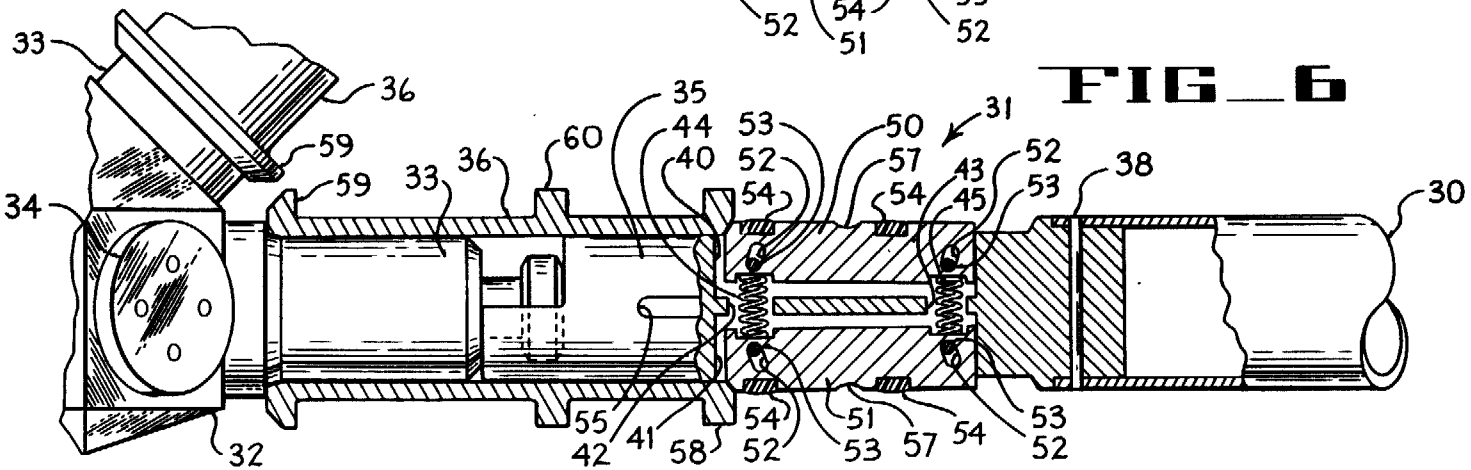
FIG. 6 is an elevation view partially in longitudinal cross section showing the distal end of the female coupling fixture of FIG. 2 in mating engagement with the distal end of the male coupling fixture of FIG. 3, where the locking sleeve of the female coupling fixture is in LOCKED position.

As indicated by the arrows in FIG. 5, the sleeve 36 can be slid from the OPEN position to another position (called the LOCKED position) as shown in FIG. 6. When the sleeve 36 is slid to the LOCKED position after the distal end of the cylindrical member 35 has engaged the distal end of the lug 33, the strut assembly is thereby locked to the node assembly. To facilitate sliding of the sleeve 36 over the outwardly urged locking bars 50 and 51, the outermost surfaces of the locking bars 50 and 51 have recesses into which bosses 54 are tightly fitted. The bosses 54 are made of a low-friction material such as polytetrafluoroethylene (Teflon), and are in contact with the interior wall of the sleeve 36 when the sleeve 36 is in the OPEN position. As the sleeve 36 is slid from the OPEN position (as illustrated in FIG. 5) to the LOCKED position (as illustrated in FIG. 6), the sleeve 36 makes sliding contact with the bosses 54.

A longitudinally extending groove 55 is provided on the outer surface of a central portion of the solid cylindrical member 35. A short pin (not visible in the cross-sectional view of FIGS. 5 and 6, but indicated by reference number 56 in the perspective view of FIG. 10) is inserted through an appropriately positioned hole in the sleeve 36 so as to extend into the groove 55. The pin 56 travels within the groove 55 as the sleeve 36 is slid coaxially over the cylindrical member 35. When the pin 36 reaches the distal end of the groove 55, further sliding of the sleeve 36 beyond the distal end of the cylindrical member 35 is prevented as the pin 56 is stopped by the distal end of the groove 55. Thus, in the event the sleeve 36 is accidentally moved to the LOCKED position before the distal end of the cylindrical member 35 has been connected to the distal end of one of the lugs 33, the pin 56 prevents the sleeve 36 from being removed from the female coupling fixture 31. Preferably, the pin 56 and the cylindrical member 35 are made of different metals.

Initially, as the sleeve 36 is being slid over the cylindrical member 35 from the OPEN position to the LOCKED position, the proximal end portions (and thereafter the intermediate portions) of the locking bars 50 and 51 are uncovered. Eventually, when the sleeve 36 reaches the LOCKED position, the locking bars 50 and 51 are fully uncovered. When the proximal end portions of the locking bars 50 and 51 are first uncovered, the spring 45 causes the locking bars 50 and 51 to rotate outwardly about the pins 53 through the apertures 52 at the distal ends thereof as pivots. When the sleeve 36 clears the distal ends of the locking bars 50 and 51, and reaches the LOCKED position, the spring 44 causes the distal ends of the locking bars 50 and 51 to snap outwardly so as to become wedged into the proximal end of the sleeve 36.

It is necessary to press the locking bars 50 and 51 together, when the sleeve 36 is to be slid from the LOCKED position back to the OPEN position in order to detach the strut assembly from the node assembly. A dimple 57 is provided on the outermost surface of each of the locking bars 50 and 51 to receive a corresponding jaw member of a vise used to press the locking bars 50 and 51 together against the bias of the springs 44 and 45.

An outwardly extending flange 58 is provided on the proximal end of the sleeve 36. An inner edge of the flange 58 is bevelled so as to make contact with a conjugately bevelled edge on the distal side of the hilt portion 37 of the cylindrical member 35, when the sleeve 36 is in the OPEN position, as illustrated in FIG. 5. When the sleeve 36 has been slid to the LOCKED position as illustrated in FIG. 6, bevelled edges on the distal ends of the locking bars 50 and 51 extend outward further than the inside diameter of the sleeve 36 so as to bear against the bevelled inner edge of the flange 58. The distal ends of the locking bars 50 and 51 are thereby wedged into the proximal end of the sleeve 36, whereby the locking bars 50 and 51 prevent the sleeve 36 from sliding back over the cylindrical member 35 from the LOCKED position to the OPEN position. The sleeve 36, when in the LOCKED position, secures the strut assembly to the node assembly.

An outwardly extending flange 59 is provided on the distal end of the sleeve 36. An inner surface at the distal end of the sleeve 36 is bevelled so as to make close contact with a conjugately bevelled annular ridge on the lug 33, when the sleeve 36 is in the LOCKED position. An outer edge on the flange 59 is chamfered as shown in FIGS. 5 and 6 to prevent contact with other flanges 59 on the sleeves 36 of the corresponding female coupling fixtures 31 of other strut assemblies coupled to lugs 33 projecting from adjacent facets of the nodal element 32.

A protruding annular rim 60 is provided on the outer surface of the sleeve 36 to facilitate gripping thereof by a construction worker engaged in erecting a truss structure using strut assemblies and node assemblies according to the present invention. As shown in FIG. 6, the rim 60 extends radially outward from the sleeve 36 to about the same extent as the flanges 58 and 59, and is located so as to fit into the coupled palm of a construction worker's hand to facilitate gripping of the sleeve 36.

Figure 7:
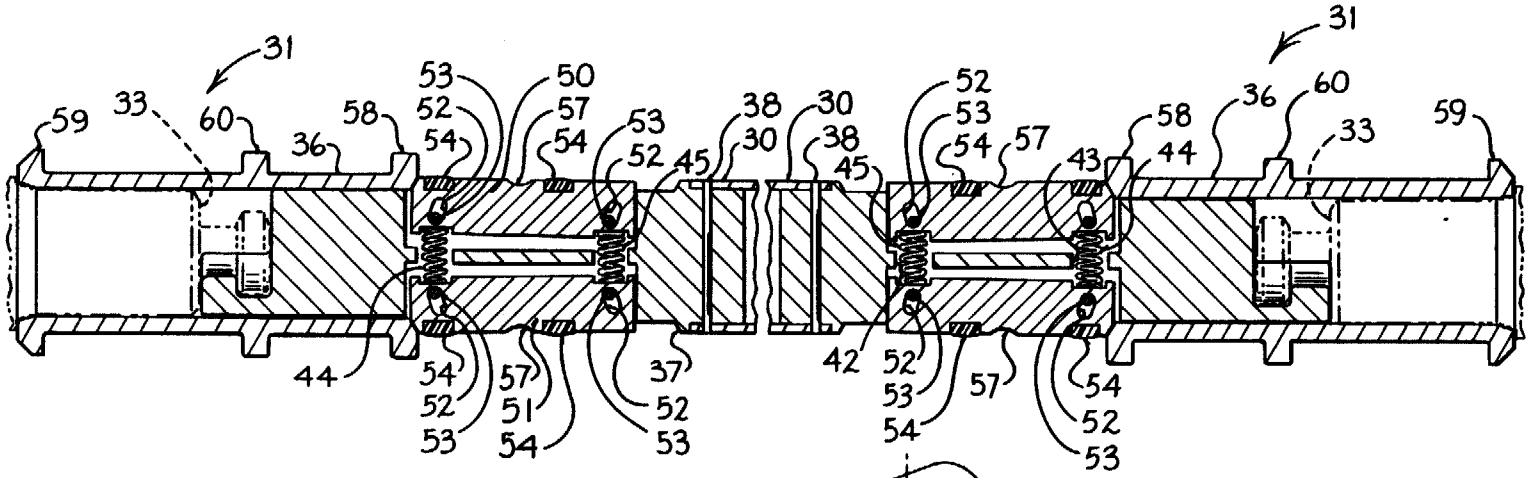
FIG. 7 is an elevation view in longitudinal cross section showing the opposite ends of the strut assembly of FIG. 2 in which the female coupling fixtures are connected to corresponding male coupling fixtures as shown in phantom outlines.
Figure 8:
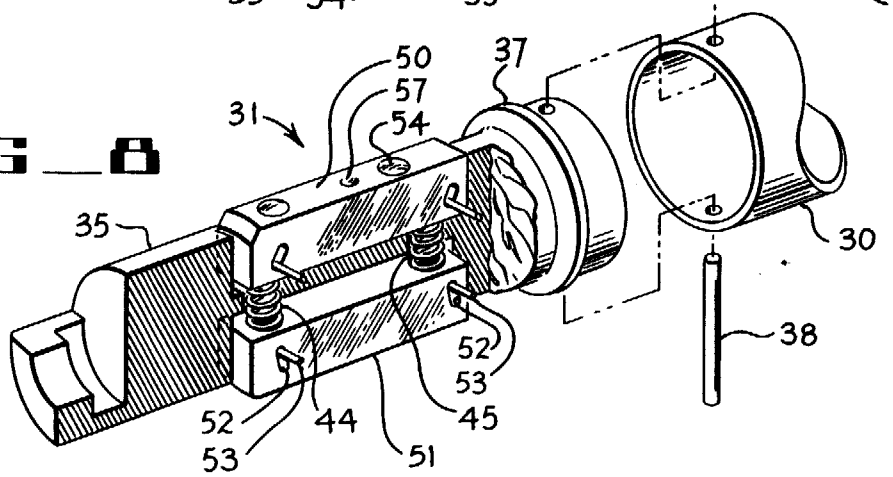
FIG. 8 is a perspective view, partially in longitudinal cross section, of a cylindrical member of the female coupling fixture of the strut assembly of FIG. 2.

In FIG. 7 a longitudinal cross-sectional view is provided of the opposite ends of the strut assembly of FIG. 2. The sleeves 36 of the female coupling fixtures 31 at the opposite ends of the strut assembly are shown in LOCKED position, whereby each end of the strut assembly is secured to a corresponding lug 33 on a corresponding nodal element 32. A perspective view in longitudinal cross section of the cylindrical member 35 of one of the female coupling structures 31 of the strut assembly is shown in FIG. 8. The cylindrical member 35 could be secured to the strut 30 by any conventional technique as representationally illustrated by the pin 38. However, for particular application, the cylindrical member 35 could be integral with the strut 30, so that the female coupling fixture 31 would be an end portion of the strut 30.

Figures 9, 10:
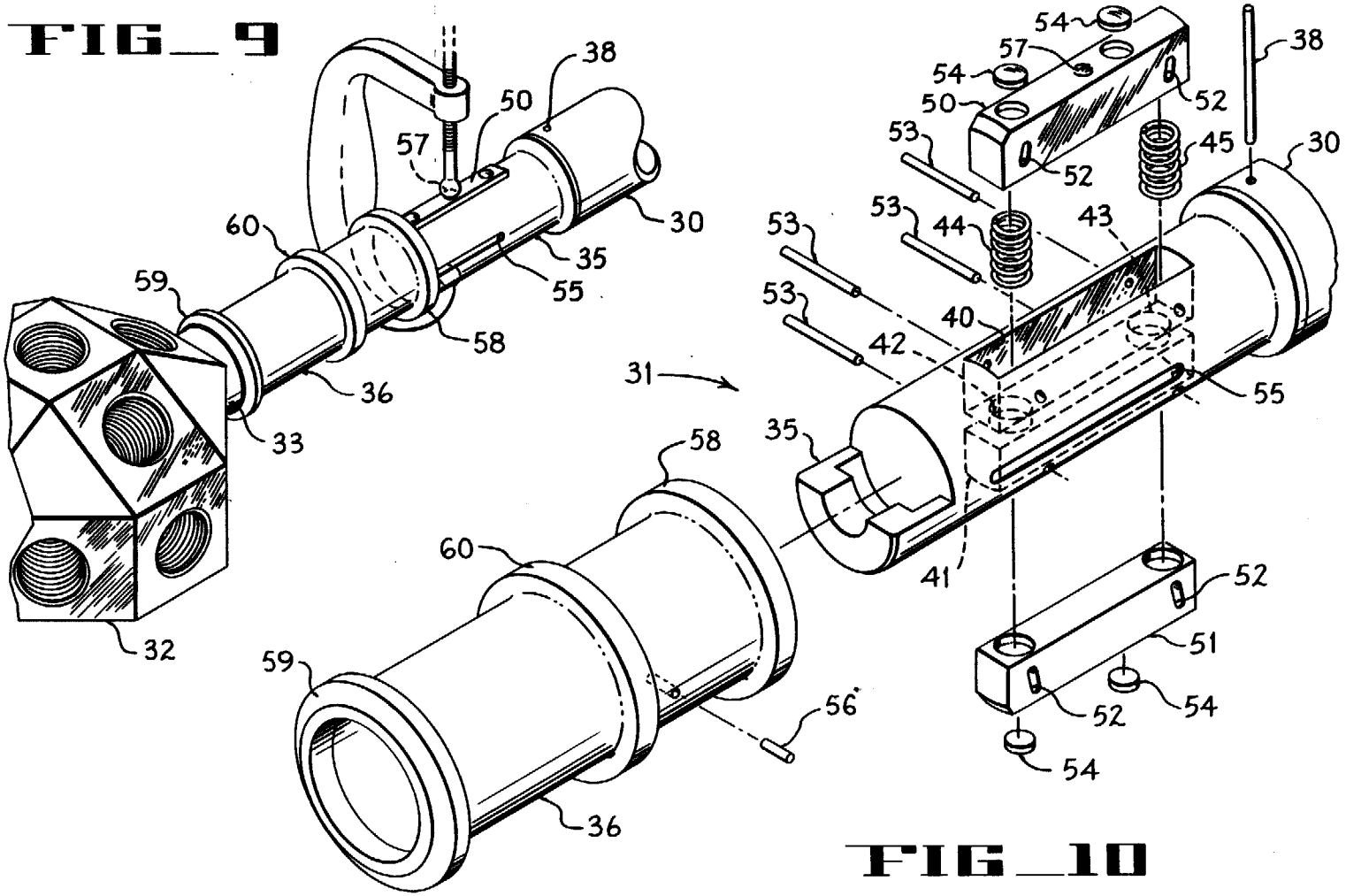
FIG. 9 is a fragmentary perspective view of the node assembly of FIG. 3 to which the strut assembly of FIG. 2 has been connected, where a technique for disconnecting the strut assembly from the node assembly is illustrated by means of a view whose jaw members are positioned to press together a pair of spring-biased locking bars mounted on the cylindrical member of the female coupling fixture.
FIG. 10 is an exploded perspective view of the female coupling fixture of the strut assembly of FIG. 2.

To disconnect a particular female coupling fixture 31 from a particular lug 33, it is necessary to press the locking bars 50 and 51 of the female coupling fixture 31 radially inward so as to compress the springs 44 and 45, thereby allowing the sleeve 36 to be slid over the cylindrical member 35 from the LOCKED position to the OPEN position. A conventional tool (illustrated in FIG. 9 by a C-clamp type of vise) can be used to press the locking bars 50 and 51 inward. As shown in FIG. 9, opposing jaw members of the C-clamp vise are seated in the dimples 57 on the radially outermost surfaces of the locking bars 50 and 51. Tension in the springs 44 and 45 is preferably strong enough so that a tool is needed to press the locking bars 50 and 51 inward in order to slide the sleeve 36 from the LOCKED position to the OPEN position when disconnecting a strut assembly from a node assembly. However, mere manual effort (without the need for any helping tool) is all that is needed to slide the sleeve 36 from the OPEN position to the LOCKED position when connecting a strut assembly to a node assembly.

In fabricating the female coupling fixture 31, as can be seen from the exploded view in FIG. 10, the springs 44 and 45 are inserted through one of the slots 40 or 41 into the transverse passageways 42 and 43, respectively, in the cylindrical member 35. After the springs 44 and 45 are in place, the locking bars 50 and 51 are inserted into the slots 40 and 41, respectively. The pins 53 are then inserted through corresponding holes in the cylindrical member 35 and through the corresponding elongated apertures 52 in the locking bars 50 and 51, whereby the locking bars 50 and 51 are retained in the slots 40 and 41. Thereafter, the sleeve 36 is fitted coaxially over the cylindrical member 35 so as to press the locking bars 50 and 51 together against the radially outward bias of the springs 44 and 45. The pin 56 is then inserted through the corresponding hole in the sleeve 36 so as to extend into the groove 55 on the surface of the cylindrical member 35, thereby preventing unintentional removal of the sleeve 36 from the cylindrical member 35.

Figure 12:
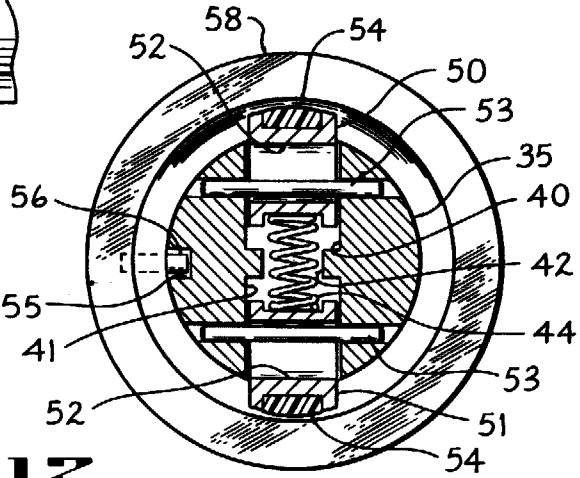
FIG. 12 is a transverse cross-sectional view of the female coupling fixture of the strut assembly of FIG. 2 as viewed along line 12—12 in FIG. 11.
Figure 11:
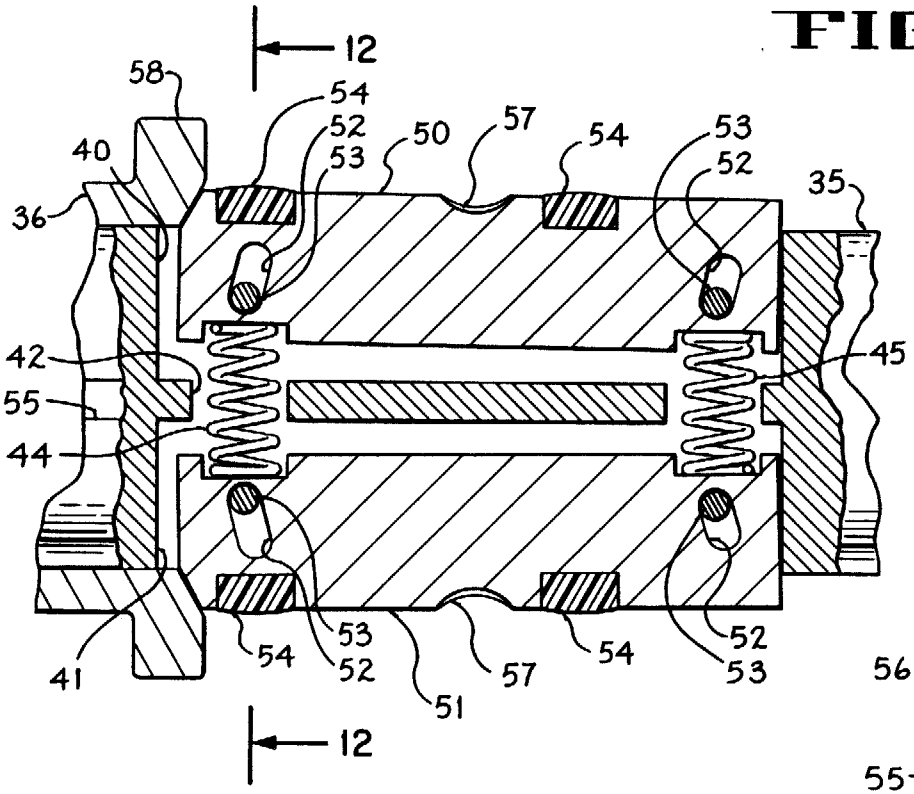
FIG. 11 is a detailed view in longitudinal cross section of a portion of the cylindrical member of the female coupling fixture of the strut assembly of FIG. 2 in which the spring-biased locking bars are positioned so as to retain the locking sleeve in LOCKED position.

FIG. 11 provides an enlarged cross-sectional view of the central portion of the female coupling fixture 31 in which the locking bars 50 and 51 are located. The pins 53 extending through the elongate apertures 52 at the proximal ends of the locking bars 50 and 51 are shown to be in contact with the innermost ends of the elongate apertures 52. However, the pins 53 passing through the elongate apertures 52 at the distal ends of the locking bars 50 and 51 are shown to be not in contact with the innermost ends of the elongate apertures 52. The wedging of the distal ends of the locking bars 50 and 51 into the proximal end of the sleeve 36 prevents the pins 53 extending through the elongate apertures 52 at the distal ends of the locking bars 50 and 51 from seating (i.e., "bottoming out") at the innermost ends of the elongate apertures 52. The bevelled edges on the distal ends of the locking bars 50 and 51 bear against the bevelled inner edge of the flange 58, thereby obstructing sliding motion of the sleeve 36 and locking the sleeve 36 securely in place around the mated distal ends of the cylindrical member 35 and the lug 33. A transverse cross-sectional view of the female coupling fixture 31 through the elongate slots 52 at the distal ends of the locking bars 50 and 51 as shown in FIG. 12.

Figure 13:
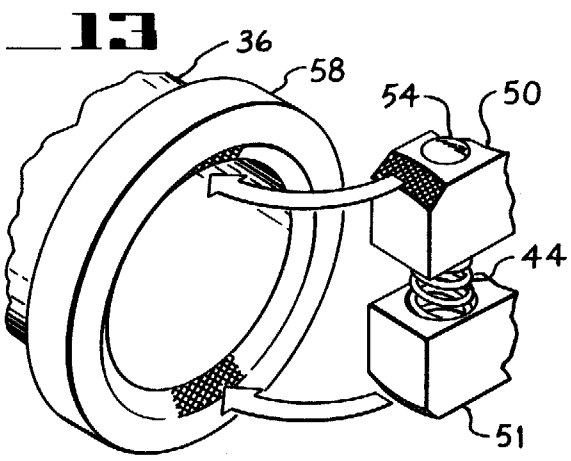
FIG. 13 is an exploded perspective view of bevelled end portions of the spring-biased locking bars and a conjugately bevelled end portion of the locking sleeve, which make contact with each other when the locking sleeve is in LOCKED position as shown in FIG. 11, where in the exploded view the locking bars are angled away from their actual axial alignment with the locking sleeve so that the areas of contact between the locking bars and the locking sleeve can be illustrated by cross-hatched shading.

In FIG. 13, the areas of contact between the bevelled inner edge of the flange 58 at the proximal end of the sleeve 36 and the conjugately bevelled outer edges on the distal ends of the locking bars 50 and 51 are shown by cross-hatched shading. The locking bars 50 and 51 are shown in FIG. 13 abnormally angled away from their actual alignment with the locking sleeve 36, so that the areas of contact can be more effectively illustrated.

Figure 14:
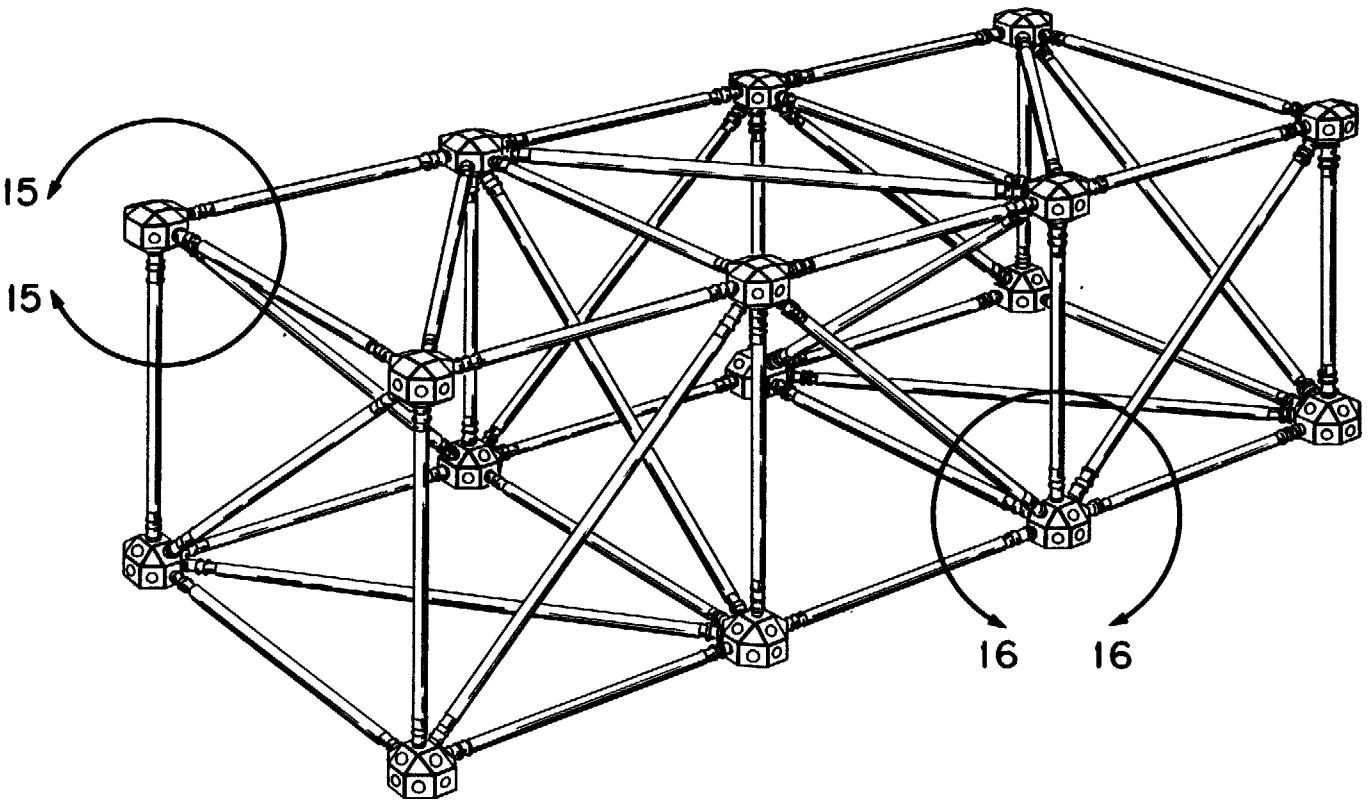
FIG. 14 is a perspective view of the truss structure of FIG. 1 after erection has been completed.
Figure 15:
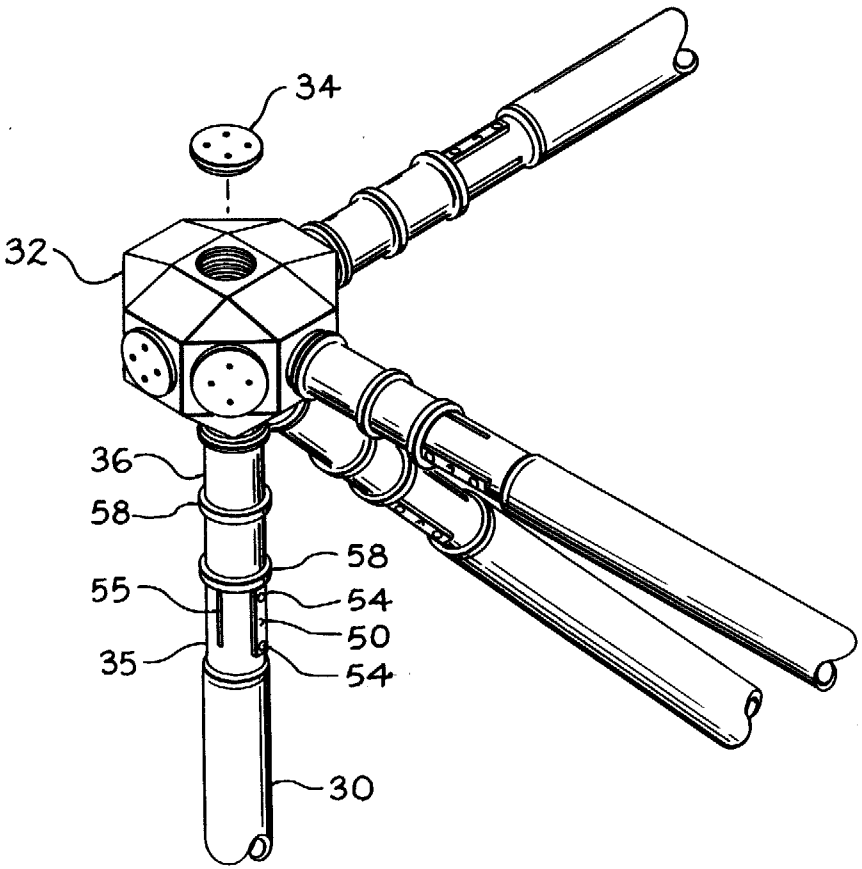
FIG. 15 is a fragmentary perspective view in enlarged detail of a corner portion of the truss structure of FIG. 1 as delineated by circular line 15—15 in FIG. 14.
Figure 16:
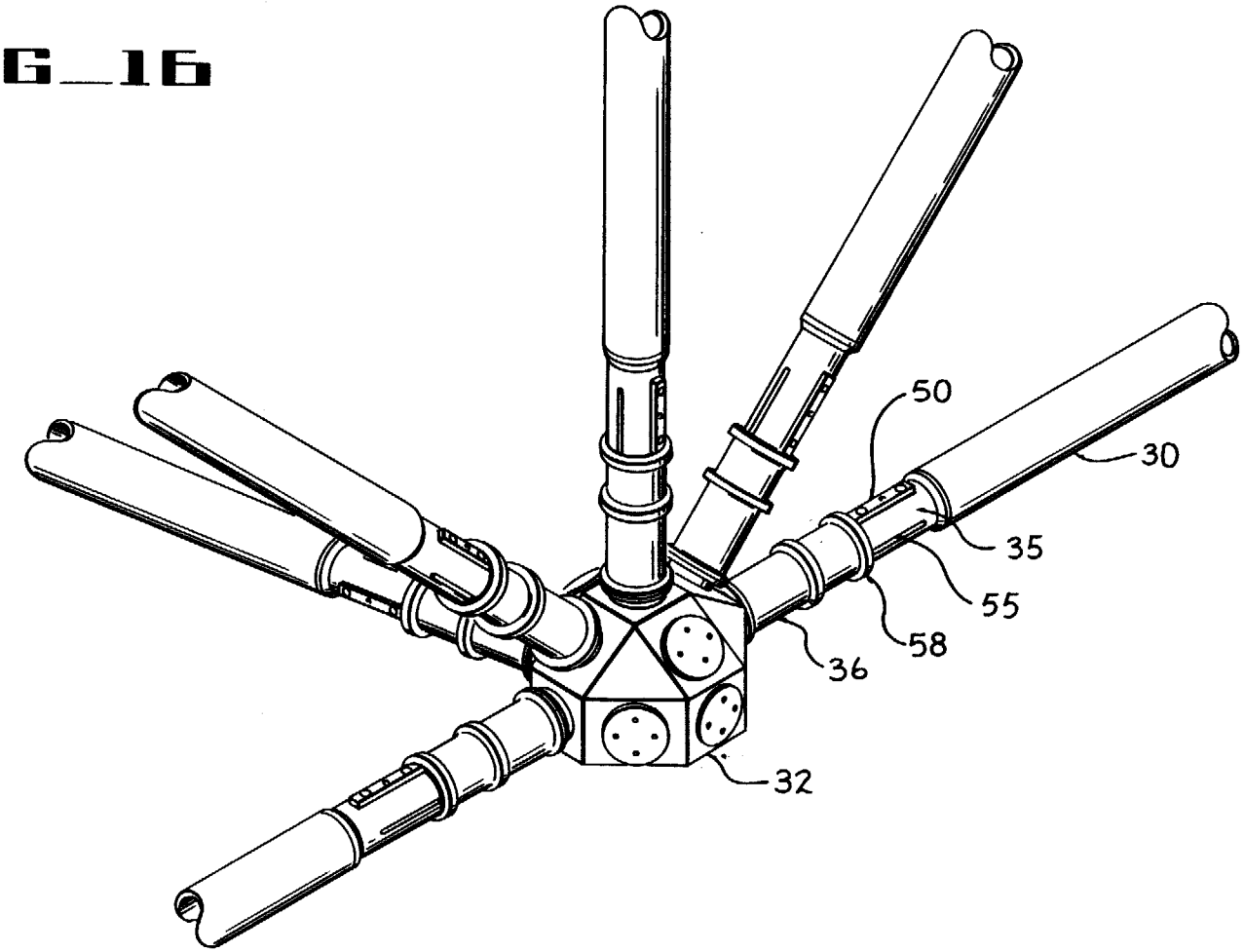
FIG. 16 is a fragmentary perspective view in enlarged detail of a side edge portion of the truss structure of FIG. 1 as delineated by circular line 16—16 in FIG. 14.

FIG. 14 provides a perspective view of the truss structure of FIG. 1 after erection has been completed. One of the corner node assemblies of the truss structure of FIG. 14 is illustrated in enlarged view in FIG. 15, and one of the node assemblies on a side edge of the truss structure of FIG. 14 is shown in enlarged view in FIG. 16. The desired configuration of the truss structure, and the position to be occupied in the truss structure by a particular nodal element 32, determine whether a lug 33 is to be affixed to any particular one of the facets of the nodal element 32.

Figure 17:
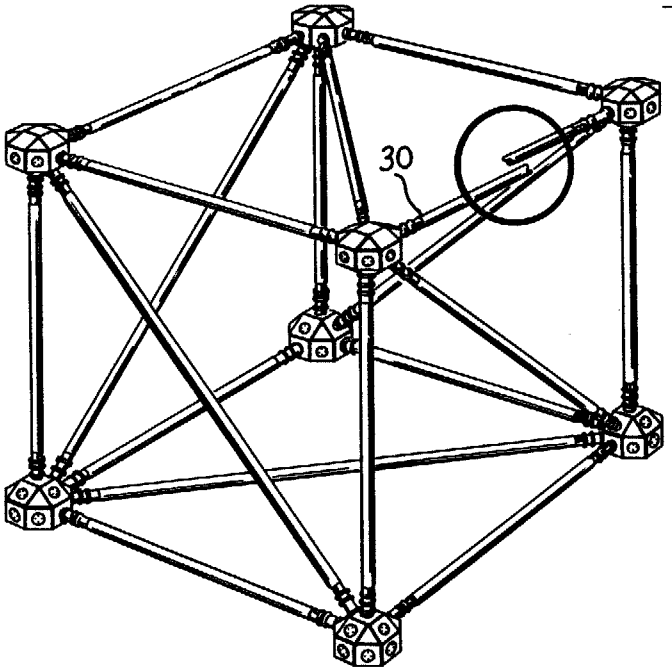
FIG. 17 is a perspective view of a truss structure made of strut assemblies and node assemblies according to the present invention, where one of the strut assemblies is defective because the strut thereof has become fractured.

In FIG. 17, a generalized representation is provided of a truss structure constructed of strut assemblies and node assemblies according to the present invention. One of the strut assemblies of the truss structure of FIG. 17 is shown to be defective, because a fracture (which is circled in FIG. 17) has developed in its strut 30. A kit according to the present invention preferably also includes replacement strut assemblies to replace strut assemblies that become defective in truss structures that have previously been built. A replacement strut assembly according to the present invention is shown in FIG. 18.

The replacement strut assembly shown in FIG. 18 comprises a strut 30' to which a female coupling fixture 31 is the type described above in connection with FIGS. 5 and 6 is attached at one end, and to which a new type of female coupling fixture as described hereinafter is attached at the other end. The strut 30' of the replacement strut assembly is substantially identical, except in length, to the strut 30 of the strut assembly that is to be replaced, as shown in of FIG. 2. In length, the strut 30' of the replacement strut assembly is shorter than the strut 30 of the defective strut assembly that is to be replaced so as to accommodate a longer length for the female coupling fixture of the replacement strut assembly.

Figure 18:
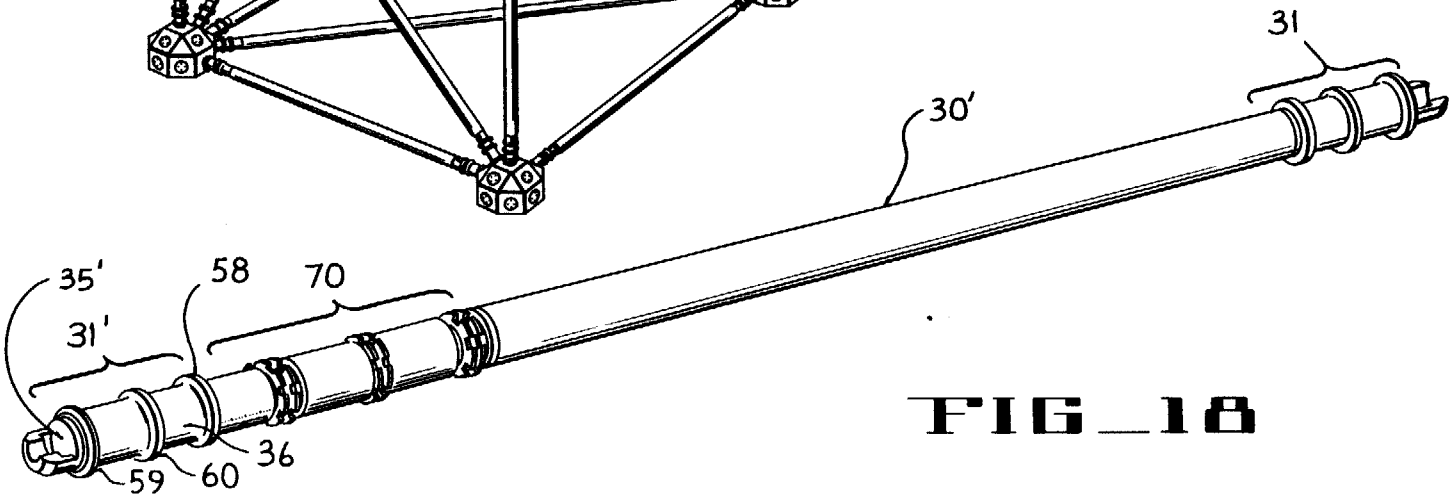
FIG. 18 is a perspective view of a replacement strut assembly to replace the defective strut assembly in the truss structure of FIG. 16, where one of the female coupling fixtures of the replacement strut assembly comprises a turnbuckle member according to the present invention.

The special female coupling fixture of the replacement strut assembly shown in FIG. 18 comprises a turnbuckle portion 70 that is affixed to one end of the strut 30', and a coupling portion 31' that is substantially equivalent in design and function to the female coupling fixture 31 described above. A longitudinal cross-sectional view of the turnbuckle portion 70 is provided in FIG. 19, in which the turnbuckle portion 70 is seen to comprise a male member 71, a female member 72, and a linking cylinder 73.

The male member 71 of the turnbuckle portion 70 is of right circular cylindrical configuration, and has a screw-threaded outer surface portion 74. A proximal end of the male member 71 is swage-fitted into the tubular strut 30', and is permanently secured thereto by a conventional technique representationally indicated by the pin 38'. In a particular application, the pin 38' could be replaced by machine screws, a riveted joint, a brazed or welded joint, a glued joint, or some other type of joint for securing the male member 71 permanently to the strut 30'. The male member 71 could be formed integrally as an end portion of the strut 30' in certain applications. A distal end of the male member 71 has an elongate projection 75 extending axially therefrom. The female member 72 is likewise of right circular cylindrical configuration, and has a screw-threaded outer surface portion 76.

In the preferred embodiment of the invention, the female member 72 of the turnbuckle portion 70 is formed integrally with (and in effect is an extension of) a cylindrical member 35' of the coupling portion 31'. A hilt 37' on the cylindrical member 35' of the coupling portion 31' corresponds structurally and functionally to the hilt portion 37 of the cylindrical member 35 of the female coupling fixture 31, and the part of the cylindrical member 35' distal of the hilt 37' is substantially identical in function to the part of the cylindrical member 35 distal of the hilt portion 37. In an alternative embodiment of the invention, however, the female member 72 of the turnbuckle portion 70 could be a structurally distinct member that is secured by a conventional technique (e.g., by swage-fitting and pinning) to the proximal end of the cylindrical member 35 of the type of female coupling fixture 31 shown in FIGS. 5 and 6.

Figure 19:
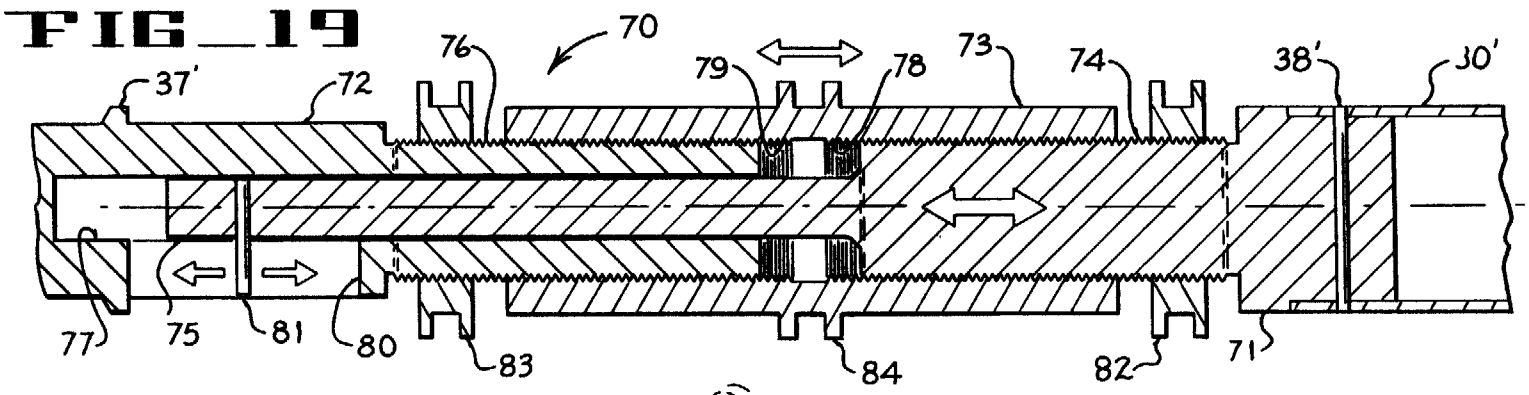
FIG. 19 is a view in longitudinal cross section of the turnbuckle member of the female coupling fixture shown in FIG. 18.
Figure 20:
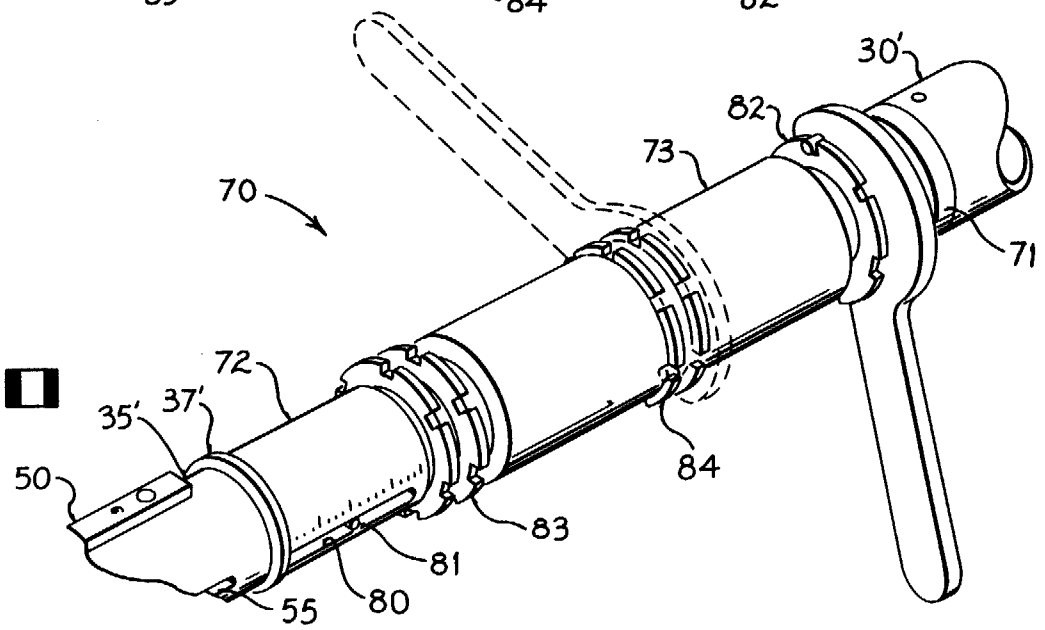
FIG. 20 is a perspective view of the turnbuckle member of the female coupling fixture of FIG. 19, where a technique for rotating a linking cylinder of the turnbuckle member is illustrated by means of a spanner wrench.

As shown in FIG. 19, an axial bore 77 is formed in the proximal end of the female member 72 to receive the projection 75 of the male member 71 in smooth sliding contact. The linking cylinder 73 has screw-threaded interior surface portions 78 and 79 at opposite ends thereof, which coaxially mesh with the screw-threaded surface portions 74 and 76 of the male and female members 71 and 72, respectively.

The direction of the screw-thread on the outer surface portion 74 of the male member 71 is opposite to the direction of the screw-thread on the outer surface portion 76 of the female member 72. Thus, for example, if the outer surface portion 74 of the male member 71 has a right-handed screw-thread, the outer surface portion 76 of the female member 72 has a left-handed screw-thread. The interior surface portions 78 and 79 of the linking cylinder 73 likewise have screw-threads of opposite directions, so that the screw-threaded interior surface portion 78 of the linking cylinder 73 meshes with the screw-threaded outer surface portion 74 on the male member 71, and so that the screw-threaded interior surface portion 79 of the linking cylinder 73 meshes with the screw-threaded outer surface portion 76 on the female member 72.

A longitudinally extending window 80 located on the cylindrical surface of the female member 72 between the screw-threaded outer surface portion 76 and the hilt 37' provides communication into the axial bore 77. An indexing pin 81, which is secured to the projection 75 extending from the distal end of the male member 71, protrudes transversely from the projection 75 through the window 80 to a position adjacent the outer cylindrical surface of the female member 72.

As indicated by the arrows in FIG. 19, rotation of the linking cylinder in one direction causes the male and female members 71 and 72 of the turnbuckle portion 70 to draw closer together, thereby causing the projection 75 on the male member 71 to move axially further into the bore 77 on the female member 72. Conversely, rotation of the linking cylinder 73 in the other direction causes the male and female members 71 and 72 to move away from each other, thereby causing the projection 75 extending from the male member 71 to move axially outward with respect to the bore 77. Thus, by rotating the linking cylinder 73, a construction worker can vary the length of the replacement strut assembly by moving the projection 75 inwardly or outwardly with respect to the bore 77.

After a desired length for the replacement strut assembly of FIG. 18 has been obtained by rotating the linking cylinder 73 a precisely measured amount, a jamb nut 82 is rotated along the screw-threaded outer surface portion 74 of the male member 71 so as to abut one end of the linking cylinder 73, and a jamb nut 83 is rotated along the screw-threaded outer surface portion 76 of the female member 72 so as to abut the other end of the linking cylinder 73. When the jamb nuts 82 and 83 are tightened in abutment against opposite ends of the linking cylinder 73, the linking cylinder 73 is thereby fixedly positioned so as to stabilize the length of the replacement strut assembly.

In the preferred embodiment of the invention, a mid-portion 84 of the external surface of the linking cylinder 73 is configured as a jamb nut to facilitate rotation of the linking cylinder 73 can be efficiently accomplished by using an appropriately dimensioned spanner wrench to apply torque to the jamb nut portion 84. As the linking cylinder 73 is rotated in one direction or the other, the outer end of the indexing pin 81 moves longitudinally along the elongate window 80 in a direction corresponding to the inward or outward movement of the projection 75 with respect to the bore 77.

Figure 21:
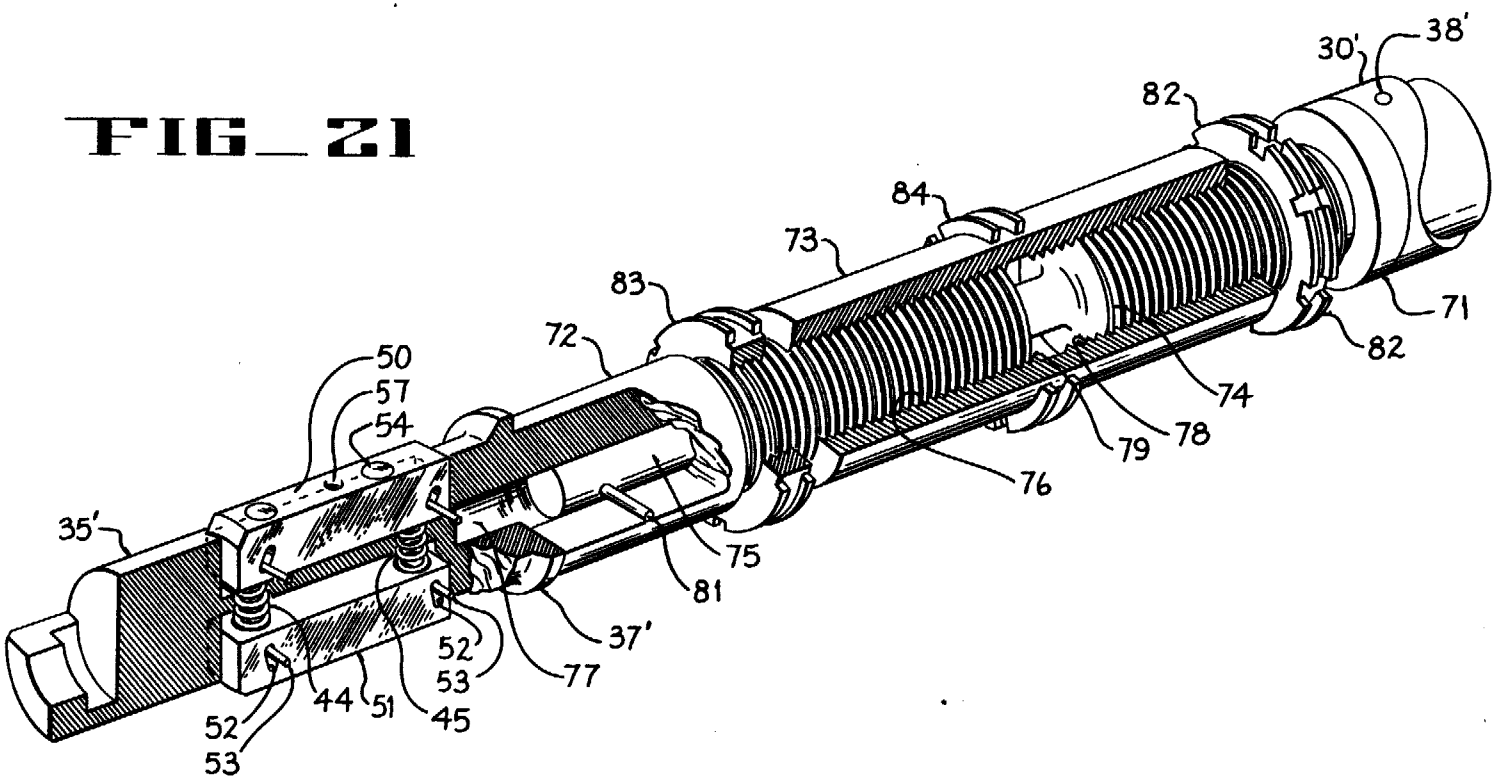
FIG. 21 is a broken-away perspective view of the female coupling fixture comprising the turnbuckle member as shown in FIG. 18.

A set of scale markers is etched or otherwise formed on the cylindrical surface of the female member 72 adjacent an edge of the elongate window 80. Movement of the outer end of the indexing pin 81 can be referred to the scale markers, whereby the precise length of the replacement strut assembly can be measured. A broken-away perspective view of a female coupling fixture having a turnbuckle portion 70 as used in the replacement strut assembly of the present invention is shown in FIG. 21, which provides a desired illustration of the mechanism whereby the length of the replacement strut assembly can be adjusted.

Figures 22, 23, 24, 25, 26, 27:
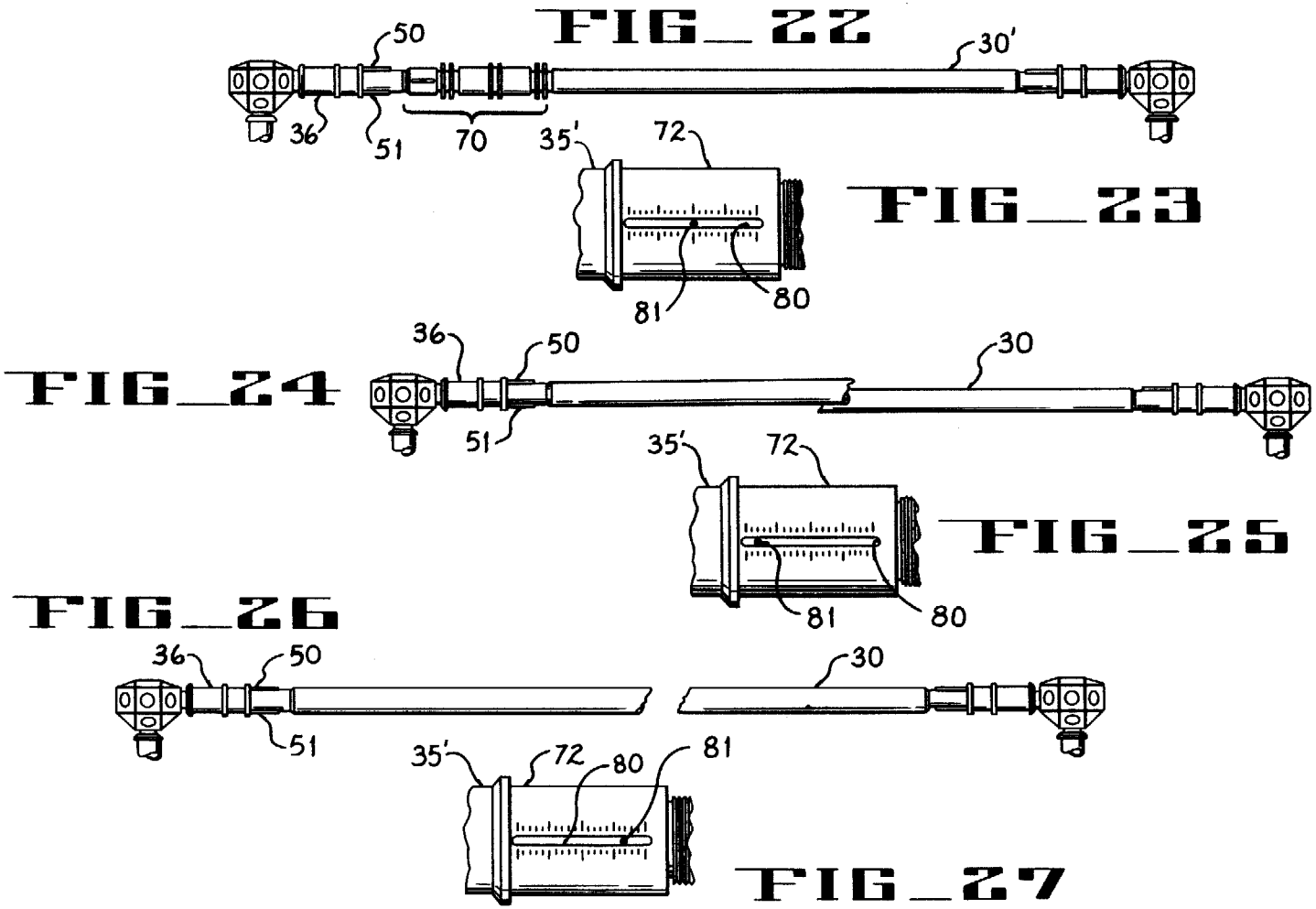
FIG. 22 is an elevation view showing the replacement strut assembly of FIG. 18 after having been installed to replace the defective strut assembly in the truss structure of FIG. 17.
FIG. 23 is an enlarged elevation view of a scale portion of the turnbuckle member of the female coupling fixture of the replacement strut assembly of FIG. 22 in which the position of an indexing pin indicates the length of the replacement strut assembly.
FIG. 24 is an elevation view showing the defective strut assembly in the truss structure of FIG. 17, where rebalancing of forces in the truss structure after the strut has been fractured causes segments of the fractured strut overlap each other.
FIG. 25 is an enlarged view of the scale portion of the turnbuckle member of the female coupling fixture of the replacement strut assembly of FIG. 18, which is used to replace the defective strut assembly of FIG. 24, where the position of the indexing pin with respect to scale markers on the turnbuckle member indicates that the length of the replacement strut assembly (when initially being installed) is less than the length of the strut assembly required by the design of the truss structure.
FIG. 26 is an elevation view showing the defective strut assembly in the truss structure of FIG. 17, where rebalancing of forces in the truss structure after the strut has been fractured causes segments of the fractured strut to become separated from each other so as to leave a gap therebetween.
FIG. 27 is an enlarged elevation view of the scale portion of the turnbuckle member of the female coupling fixture of the replacement strut assembly of FIG. 18, which is used to replace defective strut assembly of FIG. 26, where the position of the indexing pin with respect to scale markers on the turnbuckle member indicates that the length of the replacement strut assembly (when initially being installed) is greater than the length of the strut assembly required by the design of the truss structure.

In FIG. 22, a replacement strut assembly according to the present invention is shown after having been installed to replace a defective strut assembly needed to connect two node assemblies in a truss structure. The position of the indexing pin 81 relative to the scale markers adjacent the edge of the window 80 (as shown in enlarged view in FIG. 23) is seen to be at a center marker, which indicates that the linking cylinder 73 of the turnbuckle portion 70 has been rotated the precise amount needed to bring the replacement strut assembly to the correct length required by the design specifications for the truss structure.

In a particular case as illustrated in FIG. 24, a fracture has occurred in a strut 30 whose location in the truss structure is such that a rebalancing of the forces exerted on the node assemblies to which the strut 30 is joined causes the node assemblies to move toward each other, whereby segments of the fractured strut 30 overlap each other. To replace the defective strut assembly in such a case, it would be necessary for the replacement strut assembly to be initially shorter than the correct length for the strut assembly (i.e., shorter than the length required by the design specification for the truss structure) in order that the replacement strut assembly can fit into the spacing left when the defective strut assembly is removed. Thus, the linking cylinder 73 of the turnbuckle portion 70 would have to be rotated so as to reduce the length of the replacement strut assembly from its correct length when initially being installed. As illustrated in FIG. 25, the extent to which the length of the replacement strut assembly has been shortened can be measured by noting the extent to which the indexing pin 81 has travelled from a position of alignment with the center marker to a more distal position along the edge of the window 80 on the female member 72.

In another case as illustrated in FIG. 26, a fracture has occurred in a strut 30 whose location in the truss structure is such that a rebalancing of the forces exerted on the node assemblies to which the strut 30 is joined causes the node assemblies to move away from each other, whereby segments of the fractured strut 30 are separated from each other by a gap. To replace the defective strut assembly in such a case, it would be necessary for the replacement strut assembly to be initially longer than the correct length for the strut assembly in order that the replacement strut assembly can span the spacing left when the defective strut assembly is removed. Thus, the linking cylinder 73 of the turnbuckle portion 70 would have to be removed so as to increase the length of the replacement strut assembly from its correct length when initially being installed. As illustrated in FIG. 27, the extent to which the length of the replacement strut assembly has been lengthened can be measured by noting the extent to which the ihdexing pin 81 has travelled from a position of alignment with the center marker to a more proximal position along the edge of the window 80 on the female member 72.

After the replacement strut assembly has been installed, the linking cylinder 73 of the turnbuckle portion 70 of the female coupling fixture is then adjusted (i.e., rotated in one direction or the other, as appropriate) to bring the indexing pin 81 to the center marker along the edge of the window 80, whereupon the correct length for the replacement strut assembly is obtained, in effect, the turnbuckle portion 70 of the female coupling fixture of the replacement strut assembly functions as a jack to restore proper alignment of the other strut assemblies of the truss structure, thereby correcting any misalignment caused by the fracturing of the strut 30.

Figure 29:
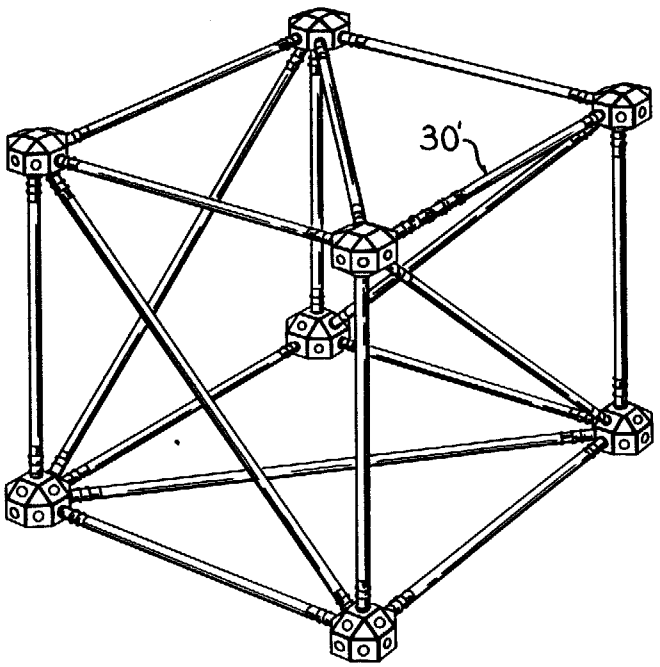
FIG. 29 is a perspective view of the truss structure of FIG. 17 after the defective strut assembly has been replaced by the replacement strut assembly of FIG. 18.
Figure 28:
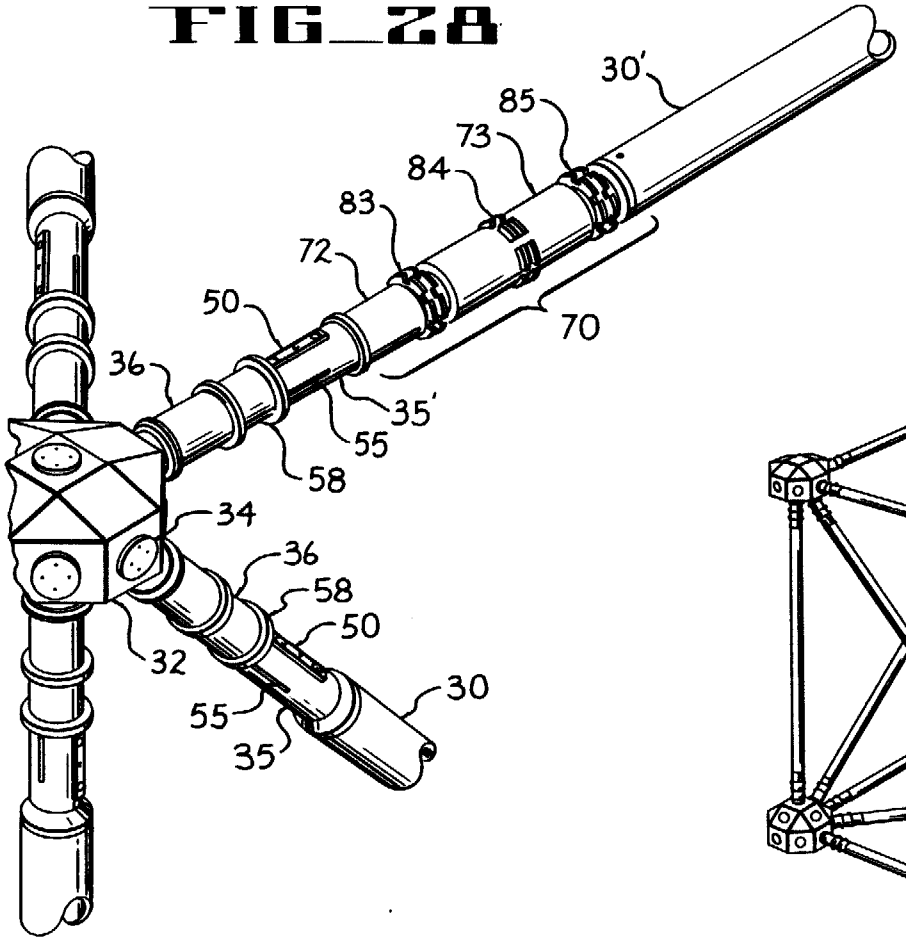
FIG. 28 is a fragmentary perspective view of a node assembly of the present invention to which four strut assemblies are connected, where one of the strut assemblies is a replacement strut assembly as shown in FIG. 18.

The scale for the markers on the edge of the window 80, and the pitch of the screw threads on the outer surface portions 74 and 76 of the male and female members 71 and 72, respectively, can be specified for any particular kit depending upon the design of the particular truss structure (or structures) to be erected using the kit. FIG. 28 is a fragmentary perspective view of a corner of the truss structure of FIG. 17 after the defective strut assembly has been replaced by a replacement strut assembly as shown in FIG. 18. A perspective view of the truss structure of FIG. 17 after the defective strut assembly has been replaced by the replacement strut assembly of FIG. 18 is shown in FIG. 29.

The present invention has been described above in terms of particular embodiments and particular applications. However, other embodiments and applications for the present invention would be apparent to practitioners skilled in the art upon perusal of the foregoing description and the accompanying drawing. Therefore, the description and drawing presented herein are to be deemed as merely illustrative of the invention, which is legally defined by the following claims and their equivalents.

I claim:

1. A method of coupling a first object to a second object, said method comprising the steps of:

(a) securing a proximal end of a male member to said first object, said male member being substantially symmetric about an axis of elongation, a distal end of said male member being configured generally as a [know] *knob* that is symmetric about said axis of elongation;

(b) securing a proximal end of [an elongate] *a* female member to said second object, *said female member being generally symmetric about a cylindrical axis,* a distal end of said female member having a contoured surface configured to receive said knob on said distal end of said male member when overlapping side contact of said contoured surface with said knob is made from any direction of approach transverse to said axis of elongation of said male member, *said female member having a pair of longitudinally extending slots adjacent said contoured surface on said distal end of said female member, said slots being substantially symmetrically disposed with respect to each other on opposite surface portions of said female member, a first passageway being provided through said female member between proximal ends of said slots, a second passageway being provided through said female member between distal ends of said slots, said first and second passageways being substantially perpendicular to said cylindrical axis of said female member, a first spring being positioned in said first passageway and a second spring being positioned in said second passageway, corresponding locking bars being disposed in said slots, said locking bars extending substantially parallel to said cylindrical axis of said female member*;

(c) bringing said contoured surface on said female member into overlapping side contact with said knob on said male member to achieve mating engagement between said female member and said male member; and (d) moving a sleeve from a first position around [an intermediate portion] *said pair of longitudinally extending slots adjacent said contoured surface on said distal end* of said female member *at which said locking bars are maintained by said sleeve radially inward with respect to said cylindrical axis of said female member* to a second position around said distal ends of said male and female members when said knob on said male member and said contoured surface on said *distal end of said* female member are in overlapping side contact with each other, *said locking bars being urged by spring bias radially outward with respect to said cylindrical axis of said female member when said sleeve is in said second position, end portions of said locking bars adjacent said proximal ends of said slots being moved outwardly by said first spring as said sleeve is being moved from said first position toward said second position, end portions of said locking bars adjacent said distal ends of said slots being moved outwardly by said second spring when said sleeve reaches said second position, said locking bars* thereby locking said *sleeve in said second position around said distal ends of said* male and female member *to retain said male and female members* in said mating engagement with each other.

2. A method of erecting a truss structure, said method comprising the steps of:

(a) bringing a contoured surface on a distal end of a first female fixture attached to one end of a first strut into overlapping side contact with a distal end of a first male fixture protruding from a first nodal element, *said first female fixture being generally cylindrical about a cylindrical axis,* said first male fixture being substantially symmetric about an axis of elongation, said distal end of said first male fixture being configured generally as a knob that is symmetric about said axis of elongation, said contoured surface on said distal end of said first female fixture being configured to receive said knob on said distal end of said first male fixture when said contoured surface on said distal end of said first female fixture is brought into overlapping side contact with said knob on said distal end of said first male fixture from any direction of approach transverse to said axis of elongation of said first male fixture;

(b) moving a first sleeve from a first position around an intermediate portion of said first female fixture *adjacent said contoured surface on said distal end of said first female fixture* to a second position on said first female fixture, *said intermediate portion of said first female fixture having a pair of longitudinally extending slots disposed substantially symmetrically with respect to each other on opposite surface portions of said first female fixture, a first passageway being provided through said first female fixture between proximal ends of said slots, a second passageway being provided through said first female fixture between distal ends of said slots, said first and second passageways being substantially perpendicular to said cylindrical axis of said first female fixture, a first spring being positioned in said first passageway and a second spring being positioned in said second passageway, corresponding locking bars being disposed in said slots, said locking bars extending substantially parallel to said cylindrical axis of said first female fixture, said locking bars being retained in a radially inward disposition with respect to said cylindrical axis of said first female fixture when said first sleeve is in said first position, said locking bars being urged by spring bias radially outward with respect to said cylindrical axis of said first female fixture, end portions of said locking bars adjacent said proximal ends of said slots being moved outwardly by said first spring as said first sleeve is being moved from said first position toward said second position, end portions of said locking bars adjacent said distal ends of said slots being moved outwardly by said second spring when said first sleeve is in said second position, said first sleeve in said second position thereby* surrounding said distal end of said first male fixture and said distal end of said first female fixture when said knob on said distal end of said first male fixture has been received by said contoured surface on said distal end of said first female fixture, *said locking bars thereby locking said first sleeve in said second position to retain said first male fixture and said first female fixture in mating engagement with each other;*

(c) bringing a contoured surface on a distal end of a second female fixture attached to an opposite end of said first strut into overlapping side contact with a distal end of a second male fixture protruding from a second nodal element, said second male fixture being of substantially identical configuration as said first male fixture, said distal end of said second male fixture being configured generally as a knob that is symmetric about an axis of elongation of said second male fixture, said second female fixture being of substantially identical configuration as said first female fixture, said contoured surface on said distal end of said second female fixture being configured to receive said [know] *knob* on said distal end of said second male fixture when said contoured surface on said distal end of said second female fixture is brought into overlapping side contact with said knob on said distal end of said second male fixture from any direction of approach transverse to said axis of elongation of said second male fixture;

(d) moving a second sleeve from a first position around an intermediate portion of said second female fixture *adjacent said contoured surface on said distal end of said second female fixture* to a second position on said second female fixture, *said intermediate portion of said second female fixture having a pair of longitudinally extending slots disposed substantially symmetrically with respect to each other on opposite surface portions of said second female fixture, a first passageway being provided through said second female fixture between proximal ends of said slots, a second passageway being provided through said second female fixture between distal ends of said slots, said first and second passageways being substantially perpendicular to said cylindrical axis of said second female fixture, a fist spring being positioned in said first passageway, and a second spring being positioned in said second passageway, corresponding locking bars being disposed in said slots, said locking bars extending substantially parallel to a cylindrical axis of said second female fixture, said locking bars being retained in a radially inward disposition with respect to*

*said cylindrical axis of said second female fixture when said second sleeve is in said first position, said locking bars being urged by spring bias radially outward with respect to said cylindrical axis of said second female fixture, end portions of said locking bars adjacent said proximal ends of said slots being moved outwardly by said first spring as said second sleeve is being moved from said first position toward said second position, end portions of said locking bars adjacent said distal ends of said slots being moved outwardly by said second spring when said second sleeve is in said second position, said second sleeve in said second position thereby* surrounding said distal end of said second male fixture and said distal end of said second female fixture when said knob on said distal end of said second male fixture has been received by said contoured surface on said distal end of said second female fixture, *said locking bars thereby locking said second sleeve in said second position to retain said second male fixture and said second female fixture in mating engagement with each other*;

(e) bringing a contoured surface on a distal end of a third female fixture attached to one end of a second strut into overlapping side contact with a distal end of a third male fixture, said third male fixture protruding from said first nodal element, said third male fixture being of substantially identical configuration as said first male fixture, said distal end of said third male fixture being configured generally as a knob that is symmetric about an axis of elongation of said third male fixture, said third female fixture being of substantially identical configuration as said first female fixture, said contoured surface on said distal end of said third female fixture being configured to receive said [know] *knob* on said distal end of said third male fixture when said contoured surface on said distal end of said third female fixture is brought into overlapping side contact with said knob on said distal end of said third male fixture from any direction of approach transverse to said axis of elongation of said third male fixture; and (f) moving a third sleeve from a first position around an intermediate portion of said third female fixture *adjacent said contoured surface on said distal end of said third female fixture* to a second position on said third female fixture, *said intermediate portion of said third female fixture having a pair of longitudinally extending slots disposed substantially symmetrically with respect to each other on opposite surface portions of said third female fixture, a first passageway being provided through said third female fixture between proximal ends of said slots, a second passageway being provided through said third female fixture between distal ends of said slots, said first and second passageways being substantially perpendicular to said cylindrical axis of said third female fixture, a first spring being positioned in said first passageway and a second spring being positioned in said second passageway, corresponding locking bars being disposed in said slots, said locking bars extending substantially parallel to a cylindrical axis of said third female fixture, said locking bars being retained in a radially inward disposition with respect to said cylindrical axis of said third female fixture when said third sleeve is in said first position, said locking bars being urged by spring bias radially outward with respect to said cylindrical axis of said third female fixture, end portions of said locking bars adjacent said proximal ends of said slots being moved outwardly by said first spring as said third sleeve is being moved from said first position toward said second position, end portions of said locking bars adjacent said distal ends of said slots being moved outwardly by said second spring when said third sleeve is in said second position, said third sleeve in said second position thereby* surrounding said distal end of said third male fixture and said distal end of said third female fixture when said knob on said distal end of said third male fixture has been received by said contoured surface on said distal end of said third female fixture, *said locking bars thereby locking said third sleeve in said second position to retain said third male fixture and said third female fixture in mating engagement with each other.*

3. The method of claim 2 comprising the further steps of:

(a) bringing contoured surfaces on distal ends of additional female fixtures attached to corresponding ends of other struts into overlapping side contact with distal ends of corresponding other male fixtures protruding from other nodal elements, each of said other male fixtures being of substantially identical configuration as said first male fixture, and each of said additional female fixtures being of substantially identical configuration as said first female fixture; and (b) moving corresponding other sleeves from first positions around intermediate portions of respective ones of said additional female fixtures to second positions on said respective ones of said additional female fixtures, [around] *the intermediate portion of each particular one of said additional female fixtures having a pair of longitudinally extending slots disposed substantially symmetrically with respect to each other on opposite surface portions of the particular one of said additional female fixtures, a first passageway being provided through the particular one of said additional female fixtures between proximal ends of said slots, a second passageway being provided through the particular one of said additional female fixtures between distal ends of said slots, said first and second passageways being substantially perpendicular to said cylindrical axis of the particular one of said additional female fixtures, a first spring being positioned in said first passageway and a second spring being positioned in said second passageway, corresponding locking bars being disposed in said slots, said locking bars extending substantially parallel to said cylindrical axis of the particular one of said additional female fixtures, said locking bars being retained in a radially inward disposition with respect to said cylindrical axis of the particular one of said additional female fixtures when the corresponding other one of said sleeves is in said first position, said locking bars being urged by spring bias radially outward with respect to said cylindrical axis of the particular one of said additional female fixtures when the corresponding other one of said sleeves is in said second position, all of said corresponding other sleeves thereby surrounding* said distal ends of said *corresponding* other male fixtures and said distal ends of *corresponding particular ones of* said additional female fixtures when the knobs on the distal ends of said *corresponding* other male fixtures have been received by the contoured surfaces on the distal ends of the corresponding *particular ones of said* additional female fixtures;

said other struts and said other nodal elements thereby being integrated with said first and second struts and with said first and second nodal elements to form said truss structure.

4. An apparatus for coupling a first object to a second object, said apparatus comprising:

(a) a male fixture, said male fixture being substantially symmetric about an axis of elongation, a proximal end of said male fixture being securable to said first object, a distal end of said male fixture having a knob-like extremity that is symmetric about said axis of elongation;

(b) a female fixture, said female fixture including:

(i) an elongate cylindrical member, a proximal end of said cylindrical member being securable to said second object, a distal end of said cylindrical member being of partially cylindrical configuration with an inner surface having a recessed portion that is contoured and dimensioned to receive said knob-like extremity on said distal end of said male fixture when overlapping side contact is made between said distal end of said male fixture and said inner surface on said distal end of said cylindrical member of said female fixture from any direction of approach transverse to said axis of elongation of said male fixture, *said cylindrical member having a pair of longitudinally extending slots adjacent said recessed portion of said inner surface thereof that is contoured and dimensioned to receive said knob-like extremity on said distal end of said male fixture, said slots being substantially symmetrically disposed with respect to each other on opposite surface portions of said cylindrical member of said female fixture, a first passageway being provided through said cylindrical member between proximal ends of said slots, a second passageway being provided through said cylindrical member between distal ends of said slots, said first and second passageways being substantially perpendicular to a cylindrical axis of said cylindrical member, a first spring being positioned in said first passageway and a second spring being positioned in said second passageway, corresponding locking bars being disposed in said slots, said locking bars extending substantially parallel to said cylindrical axis of said cylindrical member*; and (ii) a sleeve member, said sleeve member being positioned coaxially with respect to said cylindrical member, said sleeve member being slidable longitudinally over said cylindrical member from an OPEN position at which said distal end of said cylindrical member is exposed to permit overlapping side contact between said distal end of said male fixture and said inner surface on said distal end of said cylindrical member of said female fixture to a LOCKED position at which said inner surface on said distal end of said cylindrical member of said female fixture and said knob-like extremity on said distal end of said male member are surrounded by said sleeve member, *said locking bars being maintained by said sleeve member radially inward with respect to said cylindrical axis of said cylindrical member when said sleeve member is in said OPEN position, end portions of said locking bars adjacent proximal ends of said slots being moved by said first spring radially outward with respect to said cylindrical axis of said cylindrical member when said sleeve member is being slid toward said LOCKED position, end portions of said locking bars adjacent distal ends of said slots being moved by said second spring radially outward with respect to said cylindrical axis of said cylindrical member when said sleeve member has been slid to said LOCKED position, said locking bars thereby maintaining said sleeve member in said LOCKED position when said locking bars are radially outward with respect to said cylindrical axis of said cylindrical member;* said sleeve member thereby coupling said male fixture to said cylindrical member of said female fixture when said knob-like extremity on said distal end of said male fixture has been received in said recessed portion of said inner surface of said cylindrical member of said female fixture and said sleeve member has been [slide] *slid* to said LOCKED position.

[5. The coupling apparatus of claim 4 wherein said cylindrical member has a slotted portion in which a spring-biased locking bar is disposed, said locking bar being maintained by said sleeve member in a radially inward position with respect to said cylindrical member when said sleeve member is in said OPEN position, said locking bar moving to a radially outward position with respect to said cylindrical member when said sleeve member has been slid to said LOCKED position, said locking bar maintaining said sleeve member in said LOCKED position when said locking bar is in said radially outward position.]

6. The coupling apparatus of claim 4 wherein said proximal end of said cylindrical member comprises a turnbuckle mechanism for adjusting separation between said first object and said second object.

7. A [trust] *truss* structure comprising a plurality of node assemblies and a plurality of strut assemblies, each node assembly comprising:

(a) a nodal element; and (b) a plurality of male fixtures secured to said nodal element, each of said male fixtures being substantially symmetric about an axis of elongation, a distal end of each male fixture having a knob-like extremity that is symmetric about said axis of elongation;

each [stut] *strut* assembly comprising:

(a) a strut; and (b) a pair of female fixtures, each female fixture being secured to a corresponding end of said strut, each female fixture comprising:

(i) an elongate cylindrical member, a proximal end of said cylindrical member being affixed to said strut, a distal end of said cylindrical member being of partially cylindrical configuration with an inner surface having a recessed portion that is contoured and dimensioned to receive said knob-like extremity on said distal end of one of said male fixtures when overlapping side contact is made between said knob-like extremity on said distal end of said one of said male fixtures and said recessed portion of said inner surface of said distal end of said cylindrical member of said female fixture from any direction of approach transverse to the axis of elongation of said one of said male fixtures, *said cylindrical member having a pair of longitudinally extending slots adjacent said recessed portion of said inner surface thereof*

*that is contoured and dimensioned to receive said knob-like extremity on said distal end of said male fixture, said slots being substantially symmetrically disposed with respect to each other on opposite surface portions of said cylindrical member of said female fixture, a first passageway being provided through said cylindrical member between proximal ends of said slots, a second passageway being provided through said cylindrical member between distal ends of said slots, said first and second passageways being substantially perpendicular to a cylindrical axis of said cylindrical member, a first spring being positioned in said first passageway and a second spring being positioned in said second passageway, corresponding locking bars being disposed in said slots, said locking bars extending substantially parallel to said cylindrical axis of said cylindrical member*; and (ii) a sleeve member, said sleeve member being positioned coaxially with respect to said cylindrical member, said sleeve member being slidable longitudinally over said cylindrical member from an OPEN position at which said distal end of said cylindrical member is exposed to permit overlapping side contact between said knob-like extremity on said distal end of said one of said male fixtures and said recessed portion of said inner surface of said distal end of said cylindrical member of said female fixture to a LOCKED position at which said distal end of said cylindrical member is surrounded by said sleeve member, *said locking bars being maintained by said sleeve member radially inward with respect to said cylindrical axis of said cylindrical member when said sleeve member is in said OPEN position, end portions of said locking bars adjacent proximal ends of said slots being moved by said first spring radially outward with respect to said cylindrical axis of said cylindrical member when said sleeve member is being slid toward said LOCKED position, end portions of said locking bars adjacent distal ends of said slots being moved by said second spring radially outward with respect to said cylindrical axis of said cylindrical member when said sleeve member has been slid to said LOCKED position, said locking bars thereby maintaining said sleeve member in said LOCKED position when said locking bars are radially outward with respect to said cylindrical axis of said cylindrical member;* distal ends of the male fixtures of each of said node assemblies being in overlapping side contact with the inner surfaces of the distal ends of the cylindrical members of corresponding female fixtures of particular ones of said strut assemblies, the sleeve members of said female fixtures being in LOCKED position to secure said strut assemblies to said node assemblies.

8. A kit for use in erecting a truss structure, said kit comprising items for making a plurality of node assemblies and items for making a plurality of strut assemblies, each node assembly comprising the following items:

(a) a nodal element; and (b) a plurality of male fixtures securable to said nodal element, each of said male fixtures being substantially symmetric about an axis of elongation, one of each male fixture having a knob-like extremity that is symmetric about said axis of elongation;

each strut assembly comprising the following items:

(a) a strut; and (b) a pair of female fixtures, each female fixture being securable to a corresponding end of said strut, each female fixture comprising:

(i) an elongate cylindrical member, one end of said cylindrical member being affixable to said strut, another end of said cylindrical member being of partially cylindrical configuration with an inner surface having a recessed portion that is contoured and dimensioned to receive said knob-like extremity on said one end of said male fixture when overlapping side contact is made between said knob-like extremity on said one end of said male fixture and said recessed portion of said inner surface on said partially cylindrical end of said cylindrical member of said female fixture from any direction of approach transverse to said axis of elongation of said male fixture, *said cylindrical member having a pair of longitudinally extending slots adjacent said recessed portion of said inner surface on said partially cylindrical end thereof that is contoured and dimensioned to receive said knob-like extremity on said one end of said male fixture, said slots being substantially symmetrically disposed with respect to each other on opposite surface portions of said cylindrical member of said female fixture, a first passageway being provided through said cylindrical member between proximal ends of said slots, a second passageway being provided through said cylindrical member between distal ends of said slots, said first and second passageways being substantially perpendicular to a cylindrical axis of said cylindrical member, a first spring being positioned in said first passageway and a second spring being positioned in said second passageway, corresponding locking bars being disposed in said slots, said locking bars extending substantially parallel to said cylindrical axis of said cylindrical member*; and (ii) a sleeve member, said sleeve member being positioned coaxially with respect to said cylindrical member, said sleeve member being slidable longitudinally over said cylindrical member from an OPEN position at which said partially cylindrical end of said cylindrical member is exposed to permit overlapping side contact between said knob-like extremity on said one end of said male fixture and said recessed [Portion] *portion* of said inner surface on said partially cylindrical end of said cylindrical member of said female fixture to a LOCKED position at which said partially cylindrical end of said cylindrical member is surrounded by said sleeve member, *said locking bars being maintained by said sleeve member radially inward with respect to said cylindrical axis of said cylindrical member when said sleeve member is in said OPEN position, end portions of said locking bars adjacent proximal ends of said slots being moved by said first spring radially outward with respect to said cylindrical axis of said cylindrical member when said sleeve member is being slid toward said LOCKED position, end portions of said locking bars adjacent distal ends of said slots being moved by said second spring radially outward with respect to said cylindrical axis of said cylindrical member when said sleeve member has been slid to said LOCKED position, said locking bars thereby maintaining said sleeve member in said LOCKED position when*

*said locking bars are radially outward with respect to said cylindrical axis of said cylindrical member*; the sleeve member of each female fixture functioning to secure said female fixture to a corresponding one of said male fixtures on the nodal element of one of said node assemblies when the knob-like extremity on said male fixture has been received in the recessed portion of the inner surface of the partially cylindrical end of the cylindrical member of said female fixture and said sleeve member has been slid to said LOCKED position.

[9. The kit of claim 8 wherein said cylindrical member of each of said female fixtures has a slotted portion in which a spring-biased locking bar is disposed, said locking bar being maintained by said sleeve member in a radially inward position with respect to said cylindrical member when said sleeve member is in said OPEN position, said locking bar moving to a radially outward position with respect to said cylindrical member when said sleeve member has been slid to said LOCKED position, said locking bar maintaining said sleeve member in said LOCKED position when said locking bar is in said radially outward position.]

10. The kit of claim [9] *8* wherein one of the female fixtures of at least one of said strut assemblies further comprises a turnbuckle mechanism for adjusting strut assembly length.

* * * * *